United States Patent
Nakahashi et al.

(10) Patent No.: US 9,031,941 B2
(45) Date of Patent: May 12, 2015

(54) INFORMATION PROCESSING APPARATUS, TERMINAL APPARATUS, INFORMATION PRESENTATION SYSTEM, CALCULATION METHOD OF EVALUATION SCORES, AND PROGRAM

(75) Inventors: Ryo Nakahashi, Tokyo (JP); Naoki Kamimaeda, Kanagawa (JP); Katsuyoshi Kanemoto, Chiba (JP); Tomohiro Tsunoda, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/409,460

(22) Filed: Mar. 1, 2012

(65) Prior Publication Data

US 2012/0233183 A1 Sep. 13, 2012

(30) Foreign Application Priority Data

Mar. 8, 2011 (JP) ................................ 2011-050478

(51) Int. Cl.
*G06F 17/30* (2006.01)
*G06Q 30/06* (2012.01)
*G06Q 30/02* (2012.01)

(52) U.S. Cl.
CPC .......... *G06Q 30/02* (2013.01); *G06F 17/30867* (2013.01); *G06Q 30/0631* (2013.01)

(58) Field of Classification Search
CPC ...................... G06Q 30/0631; G06F 17/30867
USPC .................. 707/732, 723, 727, 728; 705/26.7
See application file for complete search history.

(56) References Cited

U.S. PATENT DOCUMENTS

| | | | |
|---|---|---|---|
| 7,406,436 B1 * | 7/2008 | Reisman | 705/7.32 |
| 2003/0139886 A1 * | 7/2003 | Bodzin et al. | 702/28 |
| 2006/0020662 A1 * | 1/2006 | Robinson | 709/203 |
| 2006/0277091 A1 * | 12/2006 | Kochikar et al. | 705/10 |
| 2007/0078845 A1 * | 4/2007 | Scott et al. | 707/5 |
| 2008/0319986 A1 * | 12/2008 | Shapira et al. | 707/5 |
| 2009/0131758 A1 * | 5/2009 | Heywood et al. | 600/300 |
| 2009/0132520 A1 * | 5/2009 | Nemeth et al. | 707/5 |

FOREIGN PATENT DOCUMENTS

JP 2003-167901 A 6/2003

OTHER PUBLICATIONS

Basilico et al., Unifying Collaborative and Content-Based Filtering, 2004.*

(Continued)

*Primary Examiner* — William Spieler
(74) *Attorney, Agent, or Firm* — Wolf, Greenfield & Sacks, P.C.

(57) ABSTRACT

Techniques are disclosed for selecting an item to recommend to a user from a plurality of items. A first set of scores indicating degrees of association between items of the plurality of items may be calculated using a first scoring algorithm having a first scale, and a second set of scores indicating degrees of association between items of the plurality of items may be calculated using a second scoring algorithm having a second scale. The second set of scores may be adjusted to match the second scale to the first scale, and a third set of scores may be calculated for the plurality of items by combining the first set of scores and the adjusted second set of scores. An item may be selected from the plurality of items to recommend to the user based on the third set of scores.

18 Claims, 25 Drawing Sheets

(56) References Cited

OTHER PUBLICATIONS

Claypool et al., Combining Content-Based and Collaborative Filters in an Online Newspaper, 1999.*
Herlocker et al., Evaluating Collaborative Filtering Recommender Systems, 2004.*
Li et al., Transfer Learning for Collaborative Filtering via a Rating-Matrix Generative Model, 2009.*
Melville et al., Content-Boosted Collaborative Filtering for Improved Recommendations, 2002.*
Su et al., A Survey of Collaborative Filtering Techniques, 2009.*
Brannick, Logistic Regression, Mar. 9, 2001.*
Hopkins, A New View of Statistics, 2000.*

* cited by examiner

FIG.3

(COMBINATION OF RECOMMENDATION ALGORITHMS:
DIFFERENCE IN SCORE SYSTEMS)

■ASSOCIATED SCORE A(i,j)

| j \ i | i=1 | i=2 |
|---|---|---|
| j=1 | 0.51 | 0.86 |
| j=2 | 0.66 | 0.54 |
| j=3 | 0.75 | 0.59 |

■ASSOCIATED SCORE B(i,j)

| j \ i | i=1 | i=2 |
|---|---|---|
| j=1 | 0.001 | 0.036 |
| j=2 | 0.016 | 0.004 |
| j=3 | 0.025 | 0.009 |

■COMPARISON BETWEEN ASSOCIATED SCORES A(i,j) AND B(i,j)

| | B(i,j) | A(i,j) |
|---|---|---|
| (i,j)=(1,1) | 0.001 | 0.51 |
| (i,j)=(2,2) | 0.004 | 0.54 |
| (i,j)=(3,2) | 0.009 | 0.59 |
| (i,j)=(2,1) | 0.016 | 0.66 |
| (i,j)=(3,1) | 0.025 | 0.75 |
| (i,j)=(1,2) | 0.036 | 0.86 |

SMALL → LARGE (COMBINATION OF RECOMMENDATION ALGORITHMS: CORRELATION)

(EXTENSION EXAMPLE)

(EXTENSION EXAMPLE)

INFORMATION PROCESSING APPARATUS, TERMINAL APPARATUS, INFORMATION PRESENTATION SYSTEM, CALCULATION METHOD OF EVALUATION SCORES, AND PROGRAM

BACKGROUND

The present technology relates to an information processing apparatus, a terminal apparatus, an information presentation system, a calculation method of evaluation scores, and a program.

In recent years, businesses using a network are expanding rapidly. For example, systems such as online stores from which commodities can be purchased online are widely used. Many of such online stores are provided with a mechanism to recommend commodities to users. If, for example, a user views detailed information of some commodity, information about commodities related to the commodity is presented to the user as recommended commodities.

Such a mechanism is realized by using, for example, a method of cooperative filtering described in Japanese Patent Application Laid-Open No. 2003-167901. The cooperative filtering is a method of extracting recommended commodities by using information (for example, a purchase history) about users having similar preferences. If the cooperative filtering is used, recommended commodities can be presented even to a new user who has no purchase history by using information about users whose preferences are similar to preferences of the user. However, if the number of users is small and it is hard to find users having similar preferences, it is difficult to present suitable recommended commodities fitting to preferences of the target user.

For extraction of recommended commodities, a method called content-based filtering may be used. The content-based filtering is a method of extracting recommended commodities to be presented to the user by using the purchase history of the user. The content-based filtering is a method of extracting recommended commodities by analyzing the purchase history of each user and thus, if this method is used, suitable recommended commodities can be extracted even if it is difficult to find users having similar preferences such as when the number of users is small. However, it is difficult for a user whose purchase history is small to present suitable recommended commodities fitting to preferences of the target user.

SUMMARY

The cooperative filtering and the content-based filtering have, as described above, respective advantages and disadvantages. Thus, to present suitable recommended commodities fitting to preferences of the user with high precision, it is necessary to use one of the methods or the other method according to circumstances or combine both methods. While commodities are illustrated here as objects to be presented to the user, there may be a case when other users are presented, music content or video content is presented, or some kind of information is presented. Thus, hereinafter, objects to be presented to the user are called items.

The common cooperative filtering and content-based filtering are illustrated here as methods of recommending items and these methods have been improved by many people. In addition to the methods illustrated here, various recommendation algorithms that can be used for item recommendation are proposed. However, each of such recommendation algorithms has advantages and disadvantages and no recommendation algorithm that can achieve suitable recommendation results in any circumstances is known. Therefore, a technology to use plural recommendation algorithms according to circumstances or to suitably combine the plural recommendation algorithms is desired.

In light of the foregoing, it is desirable to provide a novel and improved information processing apparatus, terminal apparatus, information presentation system, calculation method of evaluation scores, and program capable of suitably controlling how to combine recommendation algorithms so that high-precision recommendation results fitting to circumstances are obtained.

Some embodiments relate to apparatus for selecting an item to recommend to a user from a plurality of items, the apparatus comprising at least one processor, and at least one memory storing processor-executable instructions configured to cause the at least one processor to calculate a first set of scores indicating degrees of association between items of the plurality of items using a first scoring algorithm having a first scale, calculate a second set of scores indicating degrees of association between items of the plurality of items using a second scoring algorithm having a second scale; adjust the second set of scores to match the second scale to the first scale, calculate a third set of scores for the plurality of items by combining the first set of scores and the adjusted second set of scores, and select an item to recommend to the user from the plurality of items based on the third set of scores.

Some embodiments relate to a method for selecting an item to recommend to a user from a plurality of items, the method comprising calculating a first set of scores indicating degrees of association between items of the plurality of items using a first scoring algorithm having a first scale, calculating a second set of scores indicating degrees of association between items of the plurality of items using a second scoring algorithm having a second scale, adjusting the second set of scores, using at least one processor, to match the second scale to the first scale, calculating a third set of scores for the plurality of items by combining the first set of scores and the adjusted second set of scores, and selecting an item to recommend to the user from the plurality of items based on the third set of scores.

Some embodiments relate to at least one computer-readable storage medium encoded with computer-executable instructions that, when executed, perform a method for selecting an item to recommend to a user from a plurality of items, the method comprising calculating a first set of scores indicating degrees of association between items of the plurality of items using a first scoring algorithm having a first scale, calculating a second set of scores indicating degrees of association between items of the plurality of items using a second scoring algorithm having a second scale, adjusting the second set of scores to match the second scale to the first scale, calculating a third set of scores for the plurality of items by combining the first set of scores and the adjusted second set of scores, and selecting an item to recommend to the user from the plurality of items based on the third set of scores.

Some embodiments relate to apparatus for selecting an item to recommend to a user from a plurality of items, the apparatus comprising means for calculating a first set of scores indicating degrees of association between items of the plurality of items using a first scoring algorithm having a first scale, means for calculating a second set of scores indicating degrees of association between items of the plurality of items using a second scoring algorithm having a second scale, means for adjusting the second set of scores to match the second scale to the first scale, means for calculating a third set of scores for the plurality of items by combining the first set of scores and the adjusted second set of scores, and means for selecting an item to recommend to the user from the plurality of items based on the third set of scores.

According to the present technology, as described above, it becomes possible to suitably control how to combine recommendation algorithms so that high-precision recommendation results fitting to circumstances are obtained.

BRIEF DESCRIPTION OF THE DRAWINGS

FIG. 3 is an explanatory view exemplifying the combination method of recommendation algorithms;

DETAILED DESCRIPTION OF THE EMBODIMENT

Figure 1:
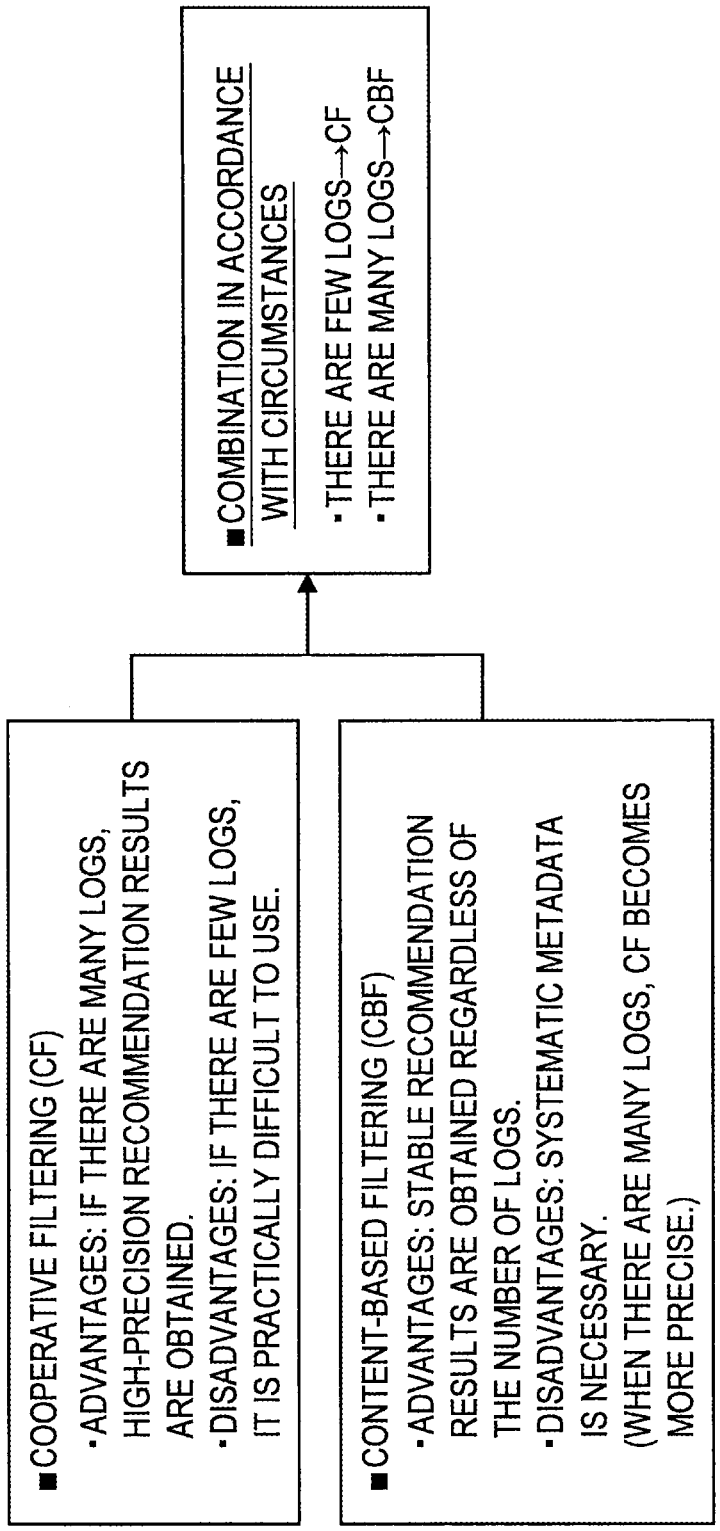
FIG. 1 is an explanatory view exemplifying a combination method of recommendation algorithms.

Hereinafter, preferred embodiments of the present disclosure will be described in detail with reference to the appended drawings. Note that, in this specification and the appended drawings, structural elements that have substantially the same function and configuration are denoted with the same reference numerals, and repeated explanation of these structural elements is omitted.

[Flow of the Description]

The flow of the description provided below will briefly be mentioned.

First, an example of the combination method of recommendation algorithms will be described with reference to FIGS. 1 to 5. Next, the combination method of recommendation algorithms according to an embodiment of the present technology will be described with reference to FIGS. 6 and 7. Next, the system configuration of a recommendation system capable of realizing the combination method of recommendation algorithms according to an embodiment of the present technology will be described with reference to FIG. 8. Next, an overview of processing performed by the recommendation system according to an embodiment of the present technology will be provided with reference to FIG. 9.

Next, the functional configuration of a server apparatus 100 according to an embodiment of the present technology will be described with reference to FIG. 10. Next, the functional configuration of a user terminal 200 according to an embodiment of the present technology will be described with reference to FIG. 11. Next, the derivation method of a correction function according to an embodiment of the present technology will be described with reference to FIG. 12. Next, the setting method of a weight according to an embodiment of the present technology will be described with reference to FIG. 13. Next, the flow of recommendation processing according to an embodiment of the present technology will be described with reference to FIG. 14. Next, the calculation method of an integrated associated score according to an embodiment of the present technology will be described with reference to FIG. 15.

Figure 16:
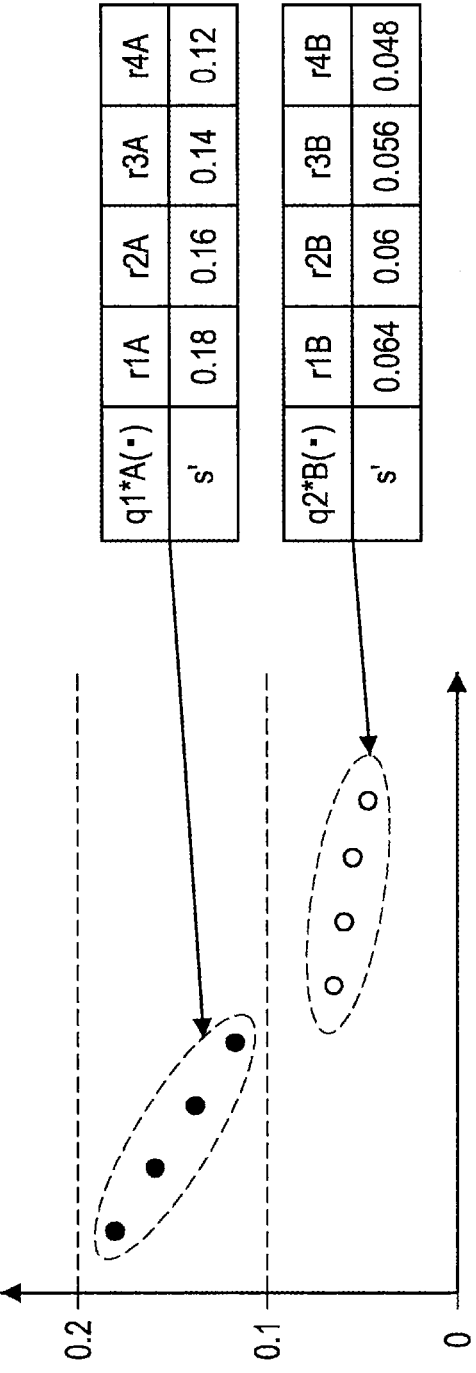
FIG. 16 is an explanatory view illustrating an influence that could be caused by a difference of score systems on an associated score.

Next, an influence that could be caused by a difference of score systems on an associated score will be described with reference to FIG. 16. Next, an effect gained when the correction method of the associated score according to an embodiment of the present technology is applied will be described with reference to FIG. 17. Next, the derivation method (extension example) of a correction function according to an embodiment of the present technology will be described with reference to FIG. 18. Next, the setting method (extension example) of the weight according to an embodiment of the present technology will be described with reference to FIG. 19. Next, the flow (extension example) of recommendation processing according to an embodiment of the present technology will be described with reference to FIG. 20.

Next, the adjustment method of the weight according to an embodiment of the present technology will be described in detail with reference to FIGS. 21 to 24. Next, a hardware configuration capable of realizing functions held by the server apparatus 100 and the user terminal 200 according to an embodiment of the present technology will be described with reference to FIG. 25. Lastly, a technical idea of the embodiment will be summarized and an operation/working-effect gained from the technical idea will briefly be described.

(Description Items)
1: Introduction
   1-1: Combination Example of Recommendation Algorithms
   1-2: Combination Method of Recommendation Algorithms
   1-3: Difference of Score Systems
2: Basic Configuration
   2-1: Combination Method of Recommendation Algorithms
   2-2: Configuration of Recommendation System
      2-2-1: System configuration
      2-2-2: Overview of processing
      2-2-3: Functional configuration of the server apparatus 100
      2-2-4: Functional configuration of the user terminal 200
   2-3: Flow of Pre-processing
      2-3-1: Derivation method of a correction function
      2-3-2: Setting method of a weight
   2-4: Flow of Recommendation Processing
3: Extension Example
   3-1: Flow of Pre-processing
      3-1-1: Derivation method of a correction function
      3-1-2: Setting method of a weight
   3-2: Flow of Recommendation Processing
4: Adjustment Method of Weight according to Feedback
   4-1: Adjustment Method of System Weight
      4-1-1: Adjustment example #1
      4-1-2: Adjustment example #2
   4-2: Adjustment Method of User Weight
5: Supplementary Description
   5-1: Adjustment Method of Weight When Feedback Is Not Used
   5-2: Update of Correction Function
   5-3: Items To Which No Associated Score Is Attached
6: Hardware Configuration Example
7: Conclusion

1: INTRODUCTION

First, an overview of issues arising when plural recommendation algorithms are simply combined and methods to solve the issues is provided.

1-1: Combination Example of Recommendation Algorithms

First, a combination example of scoring algorithms (e.g., recommendation algorithms) will be described. Cooperative filtering and content-based filtering are cited here as an example recommendation algorithms to be combined, but recommendation algorithms that can be combined are not limited to the above example.

As an example, a case when cooperative filtering and content-based filtering are combined will be considered. As shown in FIG. 1, the cooperative filtering has the advantage of being able to obtain recommendation results with high precision when there are many feedback logs for an item. On the other hand, the cooperative filtering has the disadvantage of being unable to use when the number of logs is small. The feedback here means the purchase of an item, the selection of an item, viewing of an item, browsing of detailed information about an item, pressing of the Like/Dislike buttons, reviewing and the like.

The content-based filtering has the advantage of being able to obtain stable recommendation results regardless of the number of logs. On the other hand, the content-based filtering has the disadvantage of using systematic metadata for recommendation. If the cooperative filtering is contrasted with the content-based filtering, the cooperative filtering can output more precise recommendation results when there are many feedback logs.

Thus, the cooperative filtering and the content-based filtering have respective advantages and disadvantages. Therefore, it is preferable to use the cooperative filtering or the content-based filtering according to circumstances. Thus, the inventors of the present technology attempted to develop a recommendation algorithm capable of providing high-precision recommendation results regardless of circumstances by combining plural recommendation algorithms (for example, the cooperative filtering and the content-based filtering).

1-2: Combination Method of Recommendation Algorithms

First, the inventors of the present technology reviewed a method of simply combining plural recommendation algorithms (hereinafter, referred to as a first recommendation algorithm and a second recommendation algorithm). In the review, the inventors of the present technology reviewed a recommendation system that selects recommended items based on an associated score Q obtained by linearly combining an associated score A calculated by using the first recommendation algorithm and an associated score B calculated by using the second recommendation algorithm. The method will briefly be described below.

Figure 2:
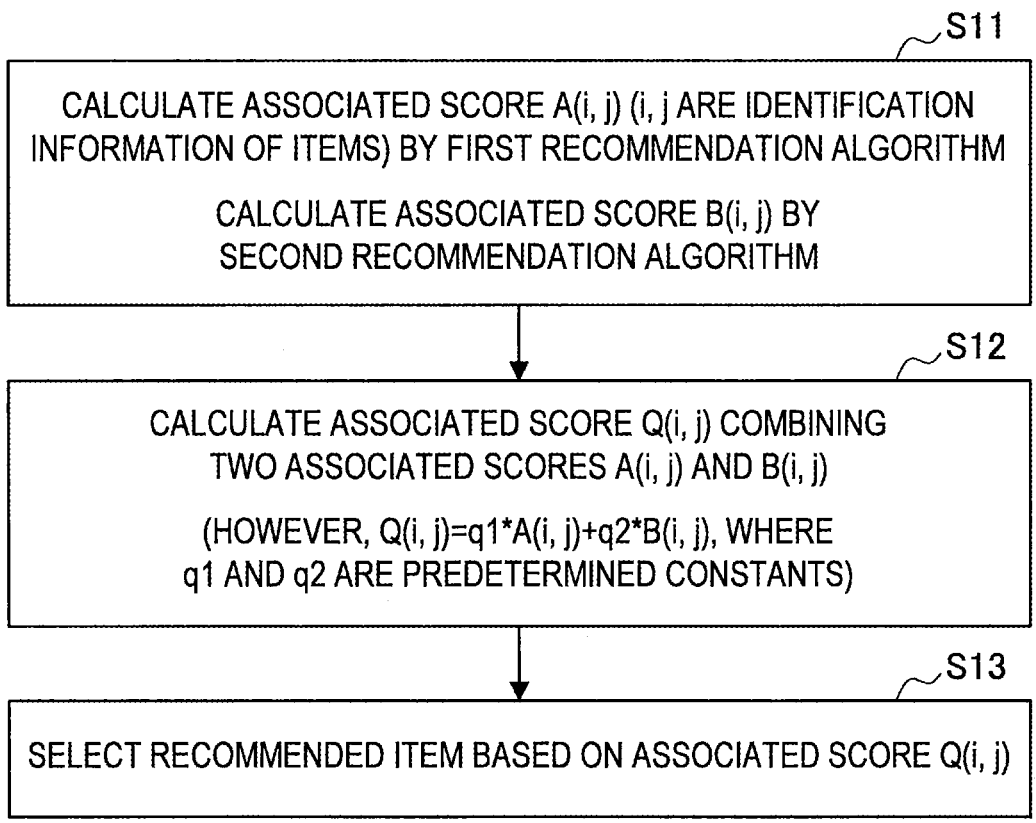
FIG. 2 is an explanatory view exemplifying the combination method of recommendation algorithms.

As shown in FIG. 2, the recommendation system first calculates the associated score $A(i, j)$ between an item i and an item j by using the first recommendation algorithm (step S11). The recommendation system also calculates the associated score $B(i, j)$ between the item i and the item j by using the second recommendation algorithm (step S11). Next, the recommendation system calculates the associated score $Q(i, j)$ by linearly combining the two associated scores $A(i, j)$ and $B(i, j)$ calculated in step S11 (step S12). The recommendation system calculates the associated score $Q(i, j)$ by, for example, Formula (1) shown below, where q1 and q2 are predetermined constants.

$$Q(i,j)=q1*A(i,j)+q2*B(i,j) \quad (1)$$

Next, the recommendation system selects recommended items based on the associated score $Q(i, j)$ calculated in step S12 (step S13). If the item to be a seed of recommendation is i, the item j for which the associated score $Q(i, j)$ is large is selected as a recommended item. The coefficients q1 and q2 are weights that decide whether to attach more importance to the first recommendation algorithm or to the second recommendation algorithm. If, for example, q1>q2 is set, recommendation results by the first recommendation algorithm are expected to be strongly reflected and if q1<q2 is set, recommendation results by the second recommendation algorithm are expected to be strongly reflected.

1-3: Difference of Score Systems

However, if the score system of the first recommendation algorithm and that of the second recommendation algorithm are significantly different, recommendation results by the first recommendation algorithm may not be strongly reflected even if the weights are set like q1>q2. Furthermore, even if the weights are set like q1=q2, recommendation results by one recommendation algorithm may strongly be reflected due to a difference of the score systems. Assume, for example, that the associated scores A(i, j) and B(i, j) take values as shown in FIG. 3. In this example, the associated score A(i, j) is incomparably larger than the associated score B(i, j).

Figure 4:
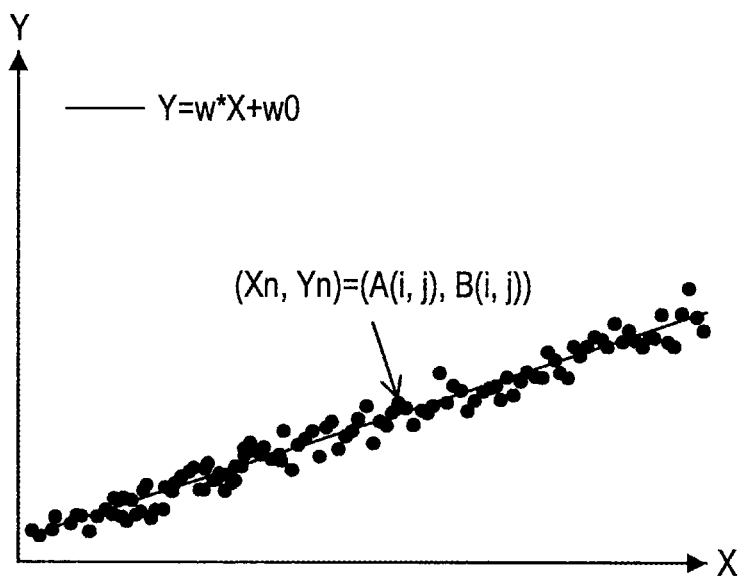
FIG. 4 is an explanatory view exemplifying the combination method of recommendation algorithms.

On the other hand, if the two associated scores A(i, j) and B(i, j) are each referred to, the associated score B(i, j) also has large values for combinations (i, j) of items for which the associated score A(i, j) is large. That is, as shown in FIG. 4, there is a correlation between the two associated scores A(i, j) and B(i, j). More specifically, in the example of FIG. 4, a linear relation is discerned between the two associated scores A(i, j) and B(i, j). The example shown in FIG. 4 is produced by plotting (Xn, Yn)=(A(i, j), B(i, j)) on an X-Y plane (n=1 to m).

Figure 5:
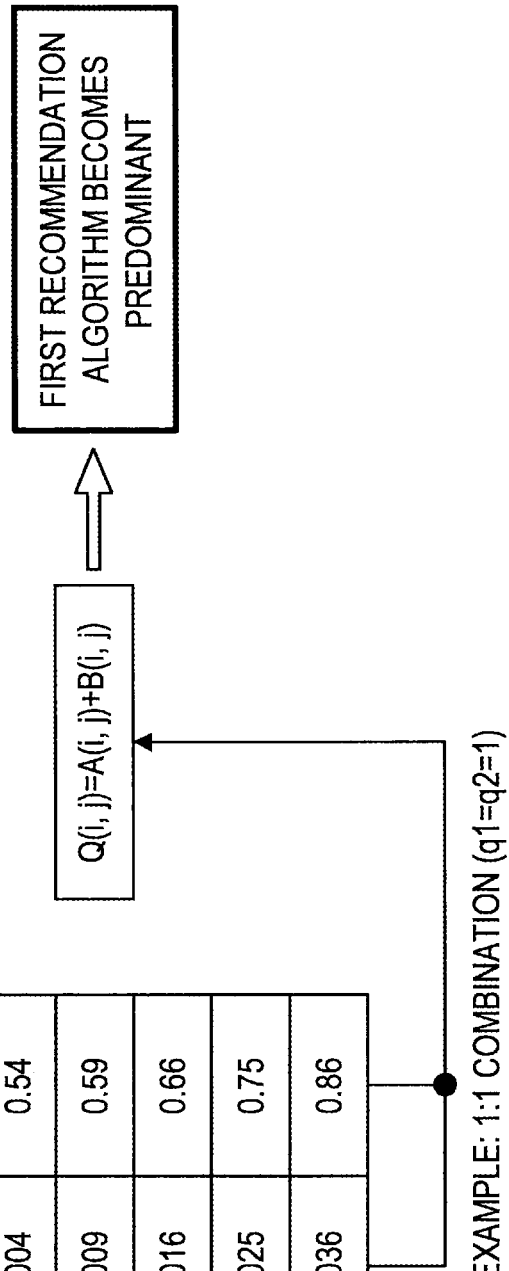
FIG. 5 is an explanatory view exemplifying the combination method of recommendation algorithms.

However, the associated score A(i, j) is incomparably larger than the associated score B(i, j) and thus, as shown in FIG. 5, an influence of the first recommendation algorithm becomes predominant if the associated score Q(i, j) is calculated based on Formula (1) shown above. While an example in which two recommendation algorithms are combined in a one-to-one ratio (when q1=q2) is shown here, the influence of the first recommendation algorithm is predominant in this example even if q1=0.8 and q2=0.2 are set to make the influence of the second recommendation algorithm stronger. Therefore, a recommendation result that is different from user's intentions may follow due to a difference of score systems between recommendation algorithms.

Incidentally, the inventors of the present technology also reviewed a method of optimizing the weight for each combination of recommendation algorithms, but came to a conclusion that it is difficult to decide the optimal weight because the optimal weight needs to be decided after adequately analyzing characteristics of recommendation algorithms. Moreover, if the optimal weight changes in accordance with the number of logs or the number of pieces of metadata, it is difficult to significantly change the weight once decided. Therefore, the inventors of the present technology developed a method of appropriately correcting the score system. The method and a recommendation system to which the method is applied will be described below.

2: BASIC CONFIGURATION

The basic configuration of a recommendation system according to an embodiment of the present technology will be described below.

2-1: Combination Method of Recommendation Algorithms

Figure 6:
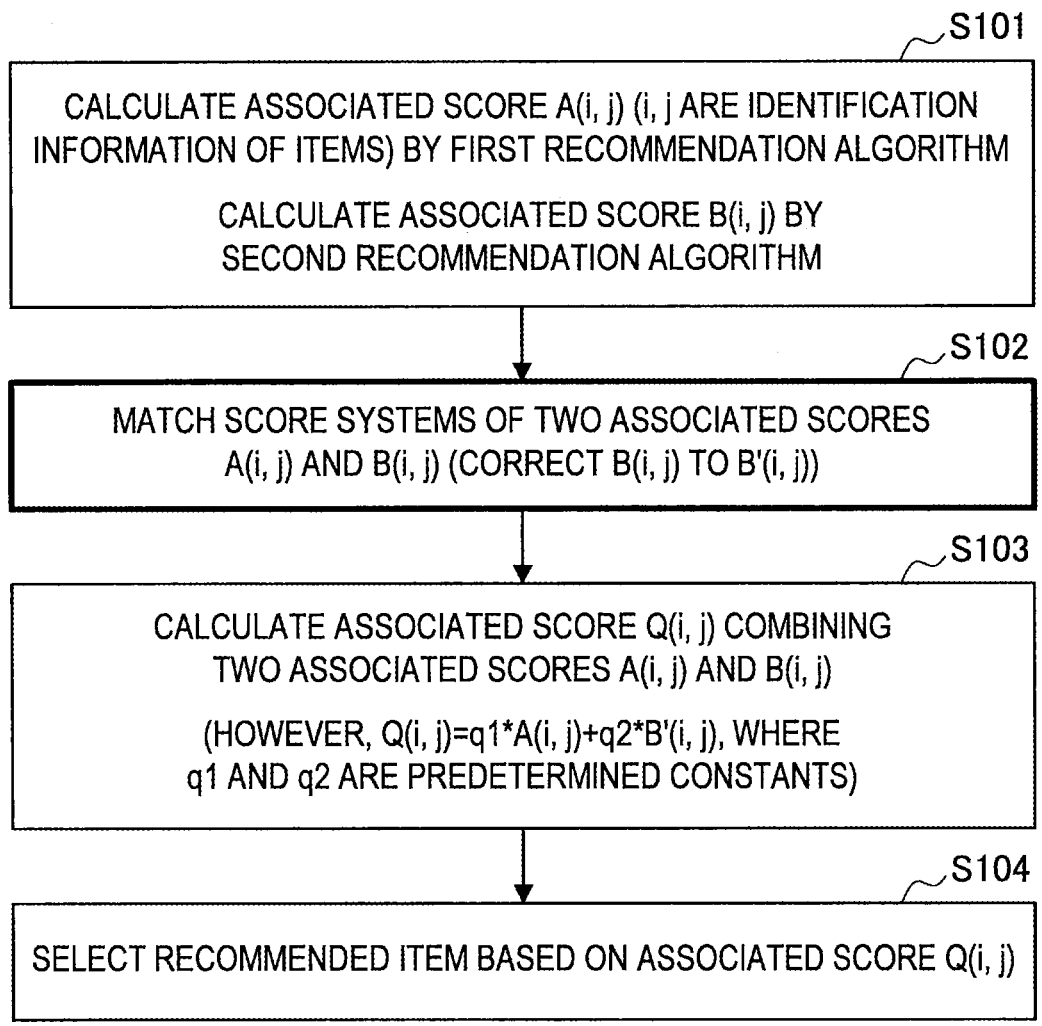
FIG. 6 is an explanatory view illustrating the combination method of recommendation algorithms according to an embodiment of the present technology.
Figure 7:
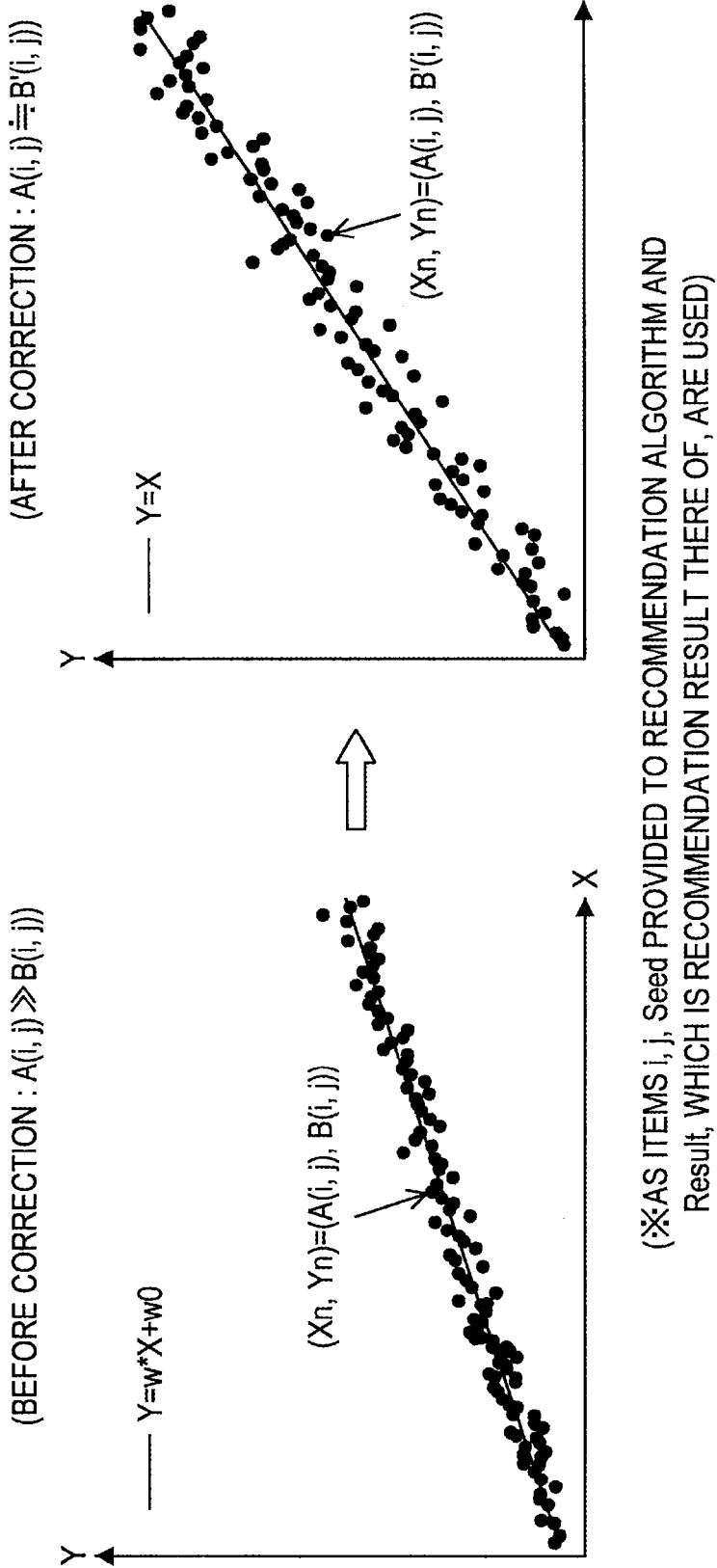
FIG. 7 is an explanatory view illustrating the combination method of recommendation algorithms according to an embodiment of the present technology.

First, an overview of the combination method of recommendation algorithms according to an embodiment of the present technology will be provided with reference to FIG. 6. FIG. 6 is an explanatory view providing an overview of the combination method of recommendation algorithms according to an embodiment of the present technology.

As shown in FIG. 6, the recommendation system first calculates the associated score A(i, j) between the item i and the item j by using the first recommendation algorithm (step S101). The recommendation system also calculates the associated score B(i, j) between the item i and the item j by using the second recommendation algorithm (step S101). Next, the recommendation system matches score systems of the two associated scores A(i, j) and B(i, j) calculated in step S101 (step S102). For example, the recommendation system calculates an associated score B'(i, j) by adjusting (e.g., correcting) the associated score B(i, j) (step S102)

Next, the recommendation system calculates the associated score Q(i, j) by linearly combining the associated score A(i, j) calculated in step S101 and the associated score B'(i, j) calculated in step S102 (step S103). The recommendation system calculates the associated score Q(i, j) by, for example, Formula (2) shown below, where q1 and q2 are predetermined constants.

$$Q(i,j)=q1*A(i,j)+q2*B'(i,j) \qquad (2)$$

Next, the recommendation system selects recommended items based on the associated score Q(i, j) calculated in step S103 (step S104). If the item to be a seed of recommendation is i, the item j for which the associated score Q(i, j) is large is selected as a recommended item. The coefficients q1 and q2 are weights that decide whether to attach more importance to the first recommendation algorithm or to the second recommendation algorithm.

As described above, the recommendation system according to an embodiment of the present technology corrects the associated score B(i, j). The correction method will supplementarily be described with reference to FIG. 7.

In the example of FIG. 5 referred to before, the associated scores have a relationship A(i, j)>>B(i, j). Plotting of (Xn, Yn)=(A(i, j), B(i, j)) on the X-Y plane based on the example looks like FIG. 7. The associated scores are related by A(i, j)>>B(i, j) before the correction and thus, each point is positioned near Y=w*X+w0 (w<<1). On the other hand, the associated scores are related by A(i, j)≈B'(i, j) after the correction and thus, each point is positioned near Y=X. That is, the recommendation system corrects the associated score B(i, j) so that the inclination of a regression line for a set of (Xn, Yn) approaches 1. Note that, as will be described later, a result of regression analysis of (Xn, Yn) is not necessarily a straight line.

In the foregoing, an overview of the combination method of recommendation algorithms according to an embodiment of the present technology has been provided. The method and the configuration of the recommendation system to which the method is applied will be described in more detail below.

2-2: Configuration of Recommendation System

Next, the configuration of the recommendation system according to an embodiment of the present technology will be described.

2-2-1: System Configuration

Figure 8:
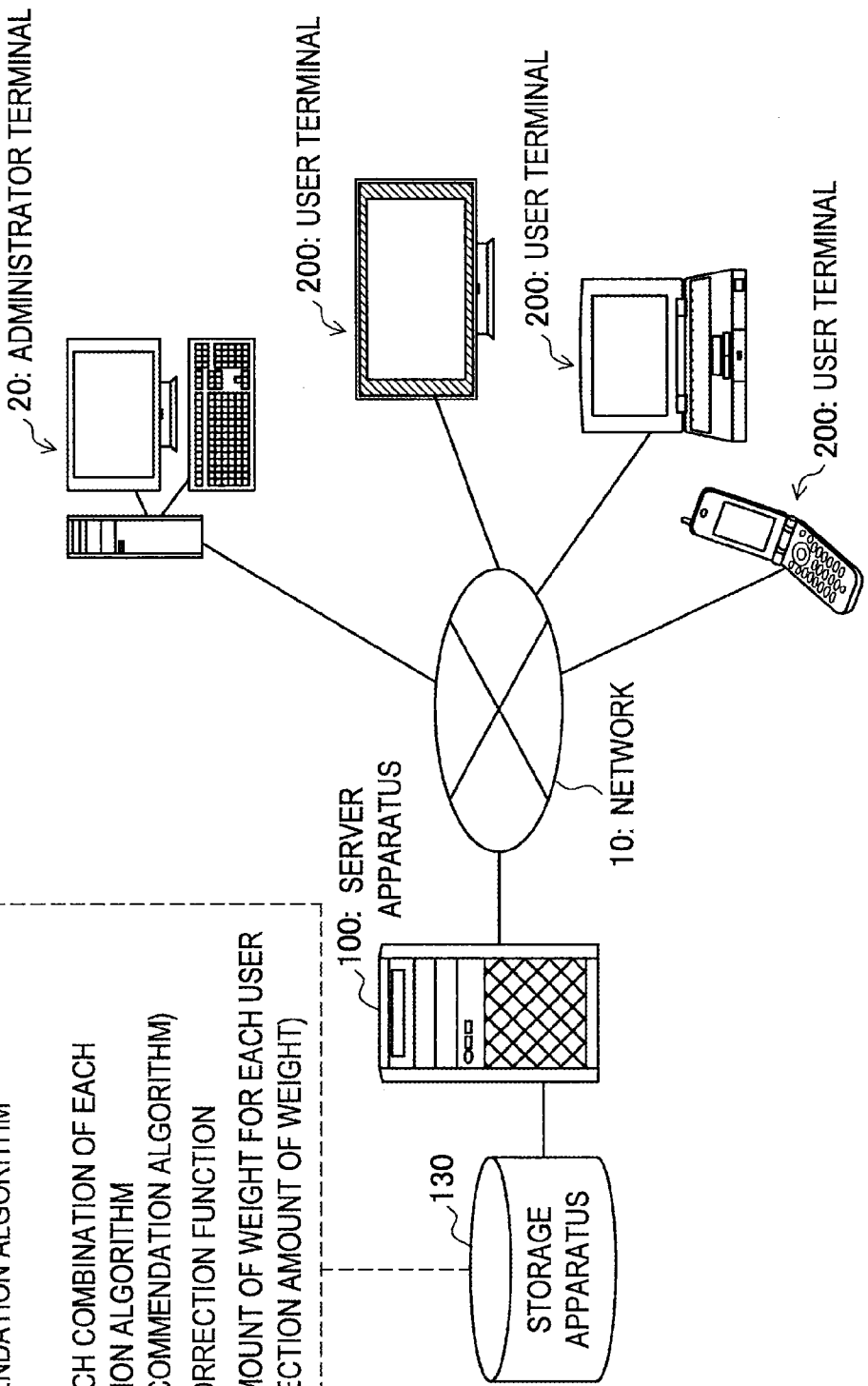
FIG. 8 is an explanatory view illustrating a system configuration of a recommendation system capable of realizing the combination method of recommendation algorithms according to an embodiment of the present technology.

First, the system configuration of the recommendation system according to an embodiment of the present technology will be described with reference to FIG. 8. FIG. 8 is an explanatory view illustrating the system configuration of a recommendation system according to an embodiment of the present technology.

As shown in FIG. 8, the recommendation system according to an embodiment of the present technology mainly includes the server apparatus 100 and the user terminal 200. The server apparatus 100 and the user terminal 200 are connected by a network 10. An administrator terminal 20 is connected to the network 10. Further, a storage apparatus 130 is connected to the server apparatus 100. The storage apparatus 130 may be contained in the server apparatus 100 or connected to the server apparatus 100 via the network 10 or another communication network.

Information stored in the storage apparatus 130 will be described. The storage apparatus 130 stores information, for example, an item, metadata attached to the item, and a log of feedback on the item given by a user. In addition, the storage apparatus 130 stores information such as calculation results of associated scores by individual recommendation algorithms, weights used when recommendation algorithms are combined, correction functions used for correcting associated scores, and correction amounts of weights.

2-2-2: Overview of Processing

Figure 9:
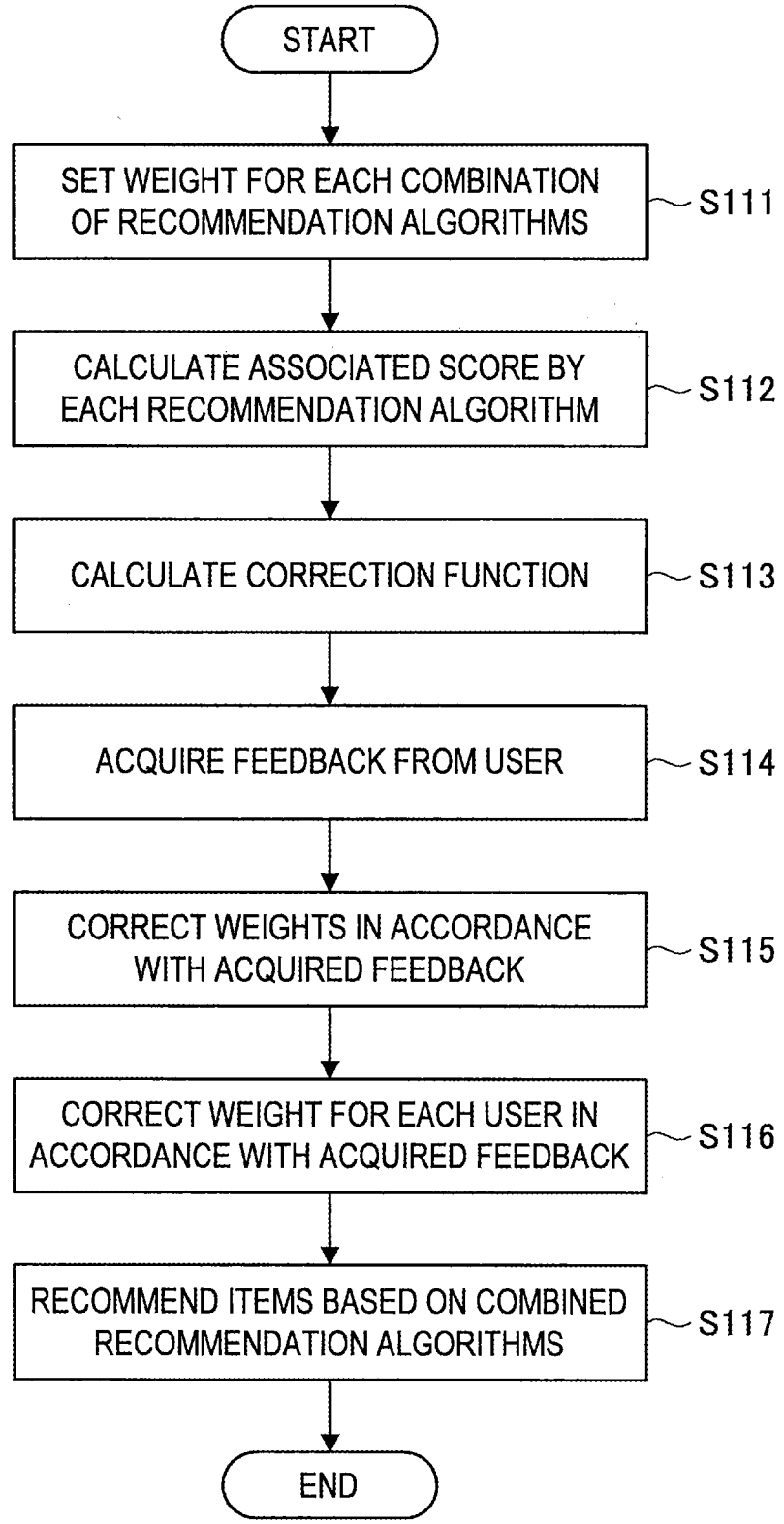
FIG. 9 is an explanatory view providing an overview of processing performed in the recommendation system according to an embodiment of the present technology.

Next, an overview of processing performed by the recommendation system according to an embodiment of the present technology will be provided with reference to FIG. 9. FIG. 9 is an explanatory view providing an overview of processing performed by the recommendation system according to an embodiment of the present technology.

As shown in FIG. 9, a system administrator first sets the weight for each combination of recommendation algorithms by using the administrator terminal 20 (step S111). The weight set in step S111 is stored in the storage apparatus 130 by the server apparatus 100. Next, the server apparatus 100 calculates associated scores by individual recommendation algorithms (step S112). If, for example, feedback is given on some item (seed), the server apparatus 100 calculates associated scores for the item by individual recommendation algorithms. The associated scores calculated in step S112 are stored in the storage apparatus 130.

Next, the server apparatus 100 generates a correction function by using associated scores stored in the storage apparatus 130 (step S113). For example, the server apparatus 100 generates a correction function f that approximates the score system of the associated score A(i, j) calculated by the first recommendation algorithm by correcting the associated score B(i, j) calculated by the second recommendation algorithm. That is, the server apparatus 100 generates the correction function f so that A(i, j)≈f(B(i, j)) holds. The correction function f generated in step S113 is stored in the storage apparatus 130.

Next, the server apparatus 100 acquires feedback input by the user via the user terminal 200 (step S114). Next, the server apparatus 100 adjusts (e.g., corrects) the weight used in common in the system in accordance with the feedback acquired in step S114 (step S115). The weight corrected in step S115 and used in common in the system is stored in the storage apparatus 130. Further, the server apparatus 100 corrects the weight for each user in accordance with the feedback acquired in step S114 (step S116). The weight for each user corrected in step S116 is stored in the storage apparatus 130.

Next, the server apparatus 100 corrects the associated scores calculated in step S112 by the correction function generated in step S113 and then combines associated scores by using the weights corrected in steps S115 and S116. Further, the server apparatus 100 selects items to be recommended to the user based on the combined associated score. Then, the server apparatus 100 recommends the selected items to the user (step S117) before terminating a sequence of processing. In the foregoing, an overview of processing performed by the recommendation system according to an embodiment of the present technology has been provided.

2-2-3: Functional Configuration of the Server Apparatus 100

Next, the functional configuration of the server apparatus 100 according to an embodiment of the present technology will be described in more detail with reference to FIG. 10. FIG. 10 is an explanatory view illustrating the functional configuration of the server apparatus 100 according to an embodiment of the present technology.

Figure 10:
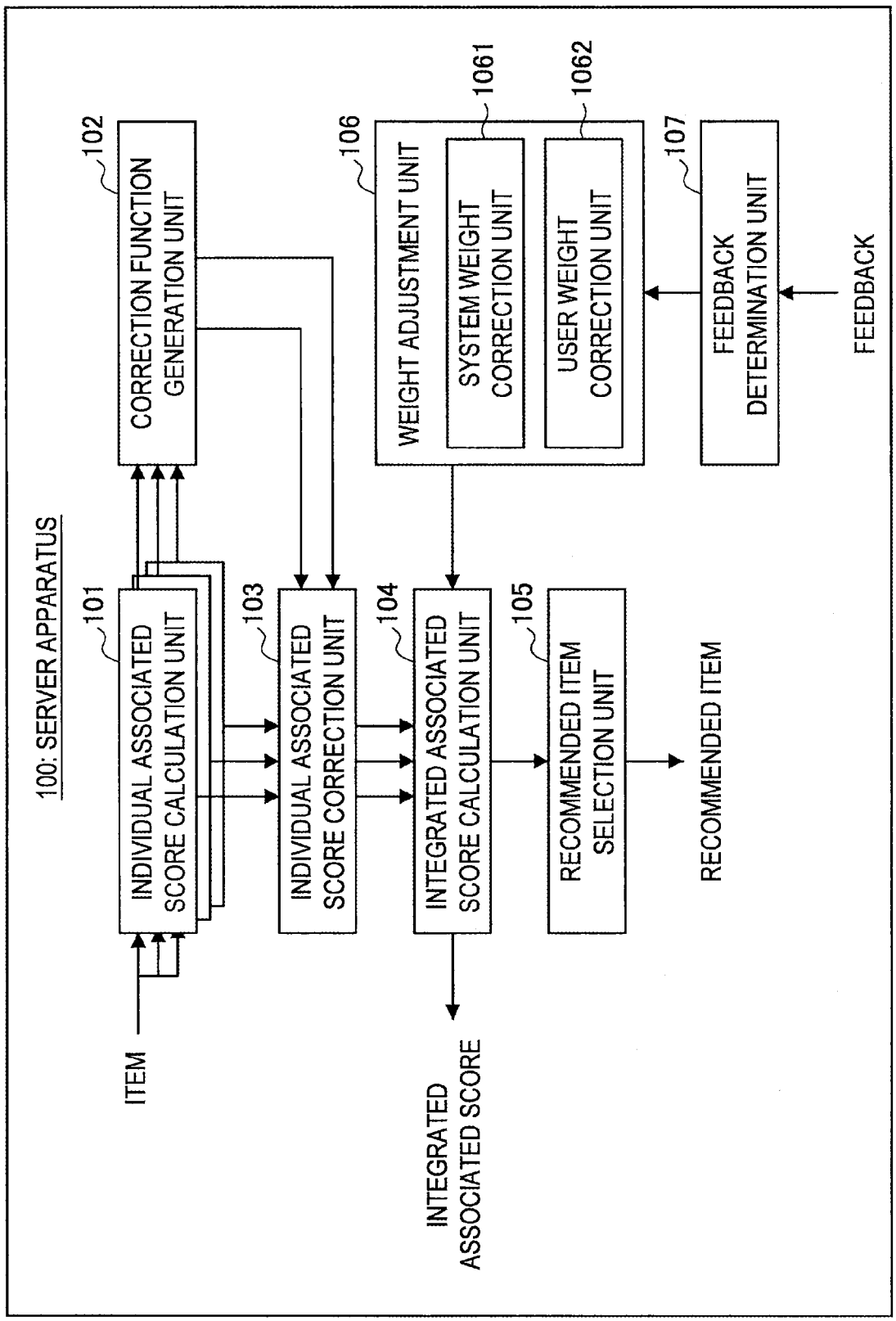
FIG. 10 is an explanatory view illustrating a functional configuration of a server apparatus according to an embodiment of the present technology.

As shown in FIG. 10, the server apparatus 100 mainly includes plural individual associated score calculation units 101, a correction function generation unit 102, an individual associated score correction unit 103, an integrated associated score calculation unit 104, and a recommended item selection unit 105. Further, the server apparatus 100 includes a weight adjustment unit 106 and a feedback determination unit 107. The weight adjustment unit 106 includes a system weight correction unit 1061 and a user weight correction unit 1062. Three units of the individual associated score calculation unit 101 are provided in the example of FIG. 10, but the number of the individual associated score calculation units 101 is increased/decreased in accordance with the number of recommendation algorithms to be combined.

The functional configuration of a server apparatus 100 will be described below along the flow of (1) Pre-processing and (2) Processing to select items r (hereinafter, recommended items r) in accordance with feedback on an item s (hereinafter, a seed item s) given by the user.

(1) Pre-Processing

As described above, the server apparatus 100 matches score systems of associated scores to be combined by using a correction function. For this purpose, the server apparatus 100 generates the correction function f by using existing item information. First, the server apparatus 100 acquires a predetermined number of items s that could become the seed items s from the storage apparatus 130. Further, the server apparatus 100 acquires a predetermined number of items r that could become the recommended items r from the storage apparatus 130. The items s, r acquired here are input into the individual associated score calculation units 101.

After the items s, r are input, the individual associated score calculation units 101 calculates associated scores of the items s, r by using respective allocated recommendation algorithms. For example, the individual associated score calculation units 101 to which the first recommendation algorithm is allocated calculates the associated score A(s, r). The individual associated score calculation units 101 to which the second recommendation algorithm is allocated calculates the associated score B(s, r). If three or more recommendation algorithms are combined, the individual associated score calculation units 101 to which one of third to N-th recommendation algorithms (N≥3) is allocated calculates one of associated scores C(s, r), D(s, r), . . . . For convenience of description, a case when two recommendation algorithms are combined will be considered.

The associated scores A(s, r) and B(s, r) calculated by the individual associated score calculation units 101 are stored in the storage unit 130 and also input into the correction function generation unit 102. Note that plural sets of the associated scores A(s, r) and B(s, r) are input into the correction function generation unit 102. After the associated scores A(s, r) and B(s, r) are input, the correction function generation unit 102 generates the correction function f by using the input associated scores A(s, r) and B(s, r). For example, if, as shown in FIG. 3, A(i, j) and B(i, j) (i=1, 2; j=1, 2, 3) are input as the associated scores A(s, r) and B(s, r), the correction function generation unit 102 generates the correction function f (f(X)=10*X+0.5 in this example, see FIG. 4) based on regression analysis.

The correction function f is a linear function in the example of FIG. 3, but the correction function f may not be a linear function depending on the combination of recommendation algorithms. In that case, the correction function generation unit 102 generates the non-linear correction function f by performing a non-linear regression analysis such as polynomial regression, power regression, logarithmic regression, and exponential regression. The correction function generation unit 102 uses, for example, a regression algorithm such as the Expectation Maximization (EM) algorithm and Wake-Sleep algorithm for regression analysis. The correction function f generated by the correction function generation unit 102 in this manner is stored in the storage unit 130 and also input into the individual associated score correction unit 103. If the correction function f becomes a linear function, coefficients of the correction function f(X)=w*X+w0 are given by Formulas (3) and (4) below if the least squares method algorithm is used. The number of samples used for regression analysis is assumed to be m.

$$w = \frac{m\sum_{k=1}^{m} xk \cdot yk - \sum_{k=1}^{m} xk \sum_{k=1}^{m} yk}{m\sum_{k=1}^{m} xk^2 - \left(\sum_{k=1}^{m} xk\right)^2} \quad (3)$$

$$w0 = \frac{\sum_{k=1}^{m} xk^2 \sum_{k=1}^{m} yk - \sum_{k=1}^{m} xk \cdot yk \sum_{k=1}^{m} xk}{m\sum_{k=1}^{m} xk^2 - \left(\sum_{k=1}^{m} xk\right)^2} \quad (4)$$

In the foregoing, the derivation method of the correction function f has been described as one piece of pre-processing. In addition to the correction function f, the pre-processing includes settings of the weights q1, q2. The weights q1, q2 are set by the system administrator via the administrator terminal 20 in advance. The weights q1, q2 set by the system administrator are stored in the storage apparatus 130.

(2) Selection Processing of the Recommended Items r

When the above pre-processing is completed, recommended items r for the seed item s can be recommended. When a presentation request of recommended items r for the seed item s is received, the individual associated score calculation unit 101 acquires items r1, r2, . . . to be candidates of the recommended items r from the storage apparatus 130. For example, the individual associated score calculation units 101 using the first recommendation algorithm acquires items r1A, r2A, . . . from the storage apparatus 130. The individual associated score calculation units 101 using the second recommendation algorithm acquires items r1B, r2B, . . . from the storage apparatus 130.

The individual associated score calculation unit 101 having acquired the items r1A, r2A, . . . to be candidates of the recommended items r calculates the associated scores A(s, r1A), A(s, r2A), . . . between the seed item s and the items r1A, r2A, . . . . The individual associated score calculation unit 101 having acquired the items r1B, r2B, . . . to be candidates of the recommended items r calculates the associated scores B(s, r1B), B(s, r2B), . . . between the seed item s and the items r1B, r2B, . . . . The associated scores A(s, r1A), A(s, r2A), . . . B(s, r1B), B(s, r2B), . . . calculated by the individual associated score calculation unit 101 are input into the individual associated score correction unit 103.

When the associated scores A(s, r1A), A(s, r2A), . . . B(s, r1B), B(s, r2B), . . . are input, the individual associated score correction unit 103 acquires the correction function f from the storage apparatus 130. Then, the individual associated score correction unit 103 corrects the associated scores B(s, r1B), B(s, r2B), . . . by using the correction function f to generate new associated scores B'(s, r1B), B'(s, r2B), . . . . More specifically, the individual associated score correction unit 103 calculates f(B(s, r1B)), f(B(s, r2B)), . . . . The new associated scores B'(s, r1B), B'(s, r2B), . . . calculated by the individual associated score correction unit 103 and the associated scores A(s, r1A), A(s, r2A), . . . are input into the integrated associated score calculation unit 104.

When the associated scores A(s, r1A), A(s, r2A), . . . B'(s, r1B), B'(s, r2B), . . . are input, the integrated associated score calculation unit 104 calculates a new associated score (hereinafter, an integrated associated score) Q(s, r) (re{r1A, r2A, . . . , r1B, r2B, . . . }) by linearly combining the input associated scores A(s, r1A), A(s, r2A), . . . B'(s, r1B), B'(s, r2B), . . . . At this point, the integrated associated score calculation unit 104 calculates the integrated associated score Q(s, r) by using, for example, the weights q1, q2 acquired from the storage apparatus 130.

The integrated associated score Q(s, r) calculated by the integrated associated score calculation unit 104 is provided to the user terminal 200. In addition, the integrated associated score Q(s, r) calculated by the integrated associated score calculation unit 104 is input into the recommended item selection unit 105. When the integrated associated score Q(s, r) is input, the recommended item selection unit 105 selects a predetermined number of items r in descending order of input integrated associated score Q(s, r) as recommended items. Then, the recommended item selection unit 105 provides the selected recommended items r to the user terminal 200.

The weights q1, q2 will supplementarily be described. As described above, the weights q1, q2 are set by the system administrator in advance. However, the weights q1, q2 set by the system administrator may not suit user's preferences. Thus, a mechanism capable of adjusting the weights q1, q2 in accordance with feedback of the user is mounted in the server apparatus 100 according to an embodiment of the present technology. Adjustments of the weights q1, q2 are made by the weight adjustment unit 106.

If the user gives feedback on the recommended item r, the feedback is input into the feedback determination unit 107. When the feedback is input, the feedback determination unit 107 determines whether the input feedback indicates a positive trend or a negative trend. For example, the purchase of an item, the selection of an item, viewing of an item, browsing of detailed information about an item, pressing of the Like button, and reviewing with a high score are feedback indicating a positive trend. On the other hand, pressing of the Dislike button and reviewing with a low score are examples of feedback indicating a negative trend.

A determination result by the feedback determination unit 107 is input into the weight adjustment unit 106. When the determination result is input, the weight adjustment unit 106 adjusts the weights q1, q2 in accordance with the determination result. A concrete adjustment method of the weight by the weight adjustment unit 106 will be described in detail later.

The weights q1, q2 adjusted by the weight adjustment unit 106 are stored in the storage apparatus 130.

In the foregoing, the functional configuration of the server apparatus 100 according to an embodiment of the present technology has been described. The functional configuration of the server apparatus 100 shown in FIG. 10 is only an example and modifications such as omission of a portion of the functional configuration and addition of a new functional configuration may be made. For example, the server apparatus 100 may be configured to provide only integrated associated scores to the user terminal 200 by omitting the recommended item selection unit 105. Alternatively, the server apparatus 100 may be configured to use the weights q1, q2 set by the system administrator permanently by omitting the weight adjustment unit 106 and the feedback determination unit 107.

2-2-4: Functional Configuration of the User Terminal 200

Figure 11:
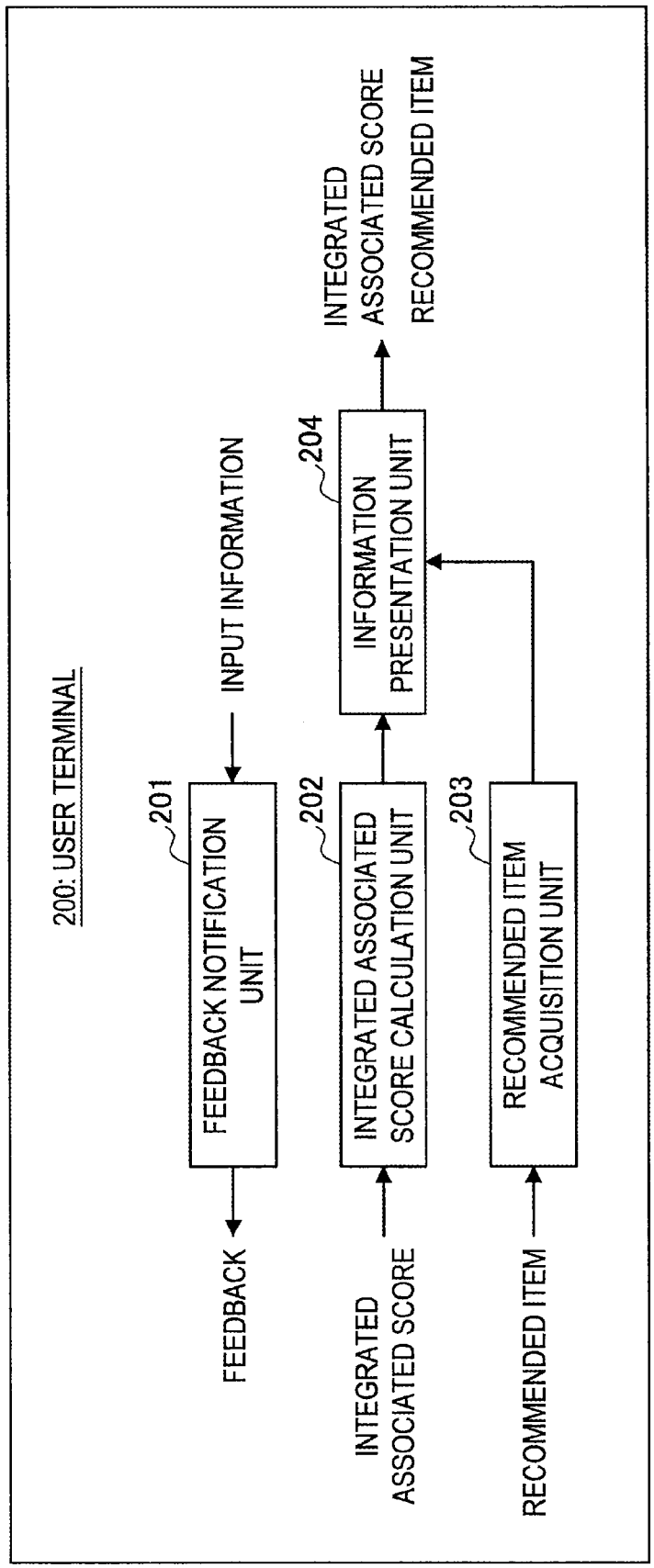
FIG. 11 is an explanatory view illustrating the functional configuration of a user terminal according to an embodiment of the present technology.

Next, the functional configuration of the user terminal 200 according to an embodiment of the present technology will be described in more detail with reference to FIG. 11. FIG. 11 is an explanatory view illustrating the functional configuration of the user terminal 200 according to an embodiment of the present technology in more detail.

As shown in FIG. 11, the user terminal 200 mainly includes a feedback notification unit 201, an integrated associated score acquisition unit 202, a recommended item acquisition unit 203, and an information presentation unit 204. The user terminal 200 can be embodied, as shown in FIG. 8, in various forms. The user terminal 200 also has an input unit and a display unit mounted thereon. As the input unit, for example, an input device such as a keyboard, mouse, touch sensor, and remote controller can be exemplified. As the display unit, a display device such as a liquid crystal display, organic electroluminescence display can be exemplified.

The user terminal 200 is used, for example, to browse items and give feedback on an item. If the user gives feedback on an item by using the input unit, the feedback is input into the feedback notification unit 201. When the feedback is input, the feedback notification unit 201 sends the input feedback to the server apparatus 100 and request recommendation of items from the server apparatus 100. When the request is received, as described above, the server apparatus 100 provides the integrated associated score Q(s, r) relating to the seed item s and the recommended items r to the user terminal 200.

The user terminal 200 acquires the integrated associated score Q(s, r) from the server apparatus 100 by using a function of the integrated associated score acquisition unit 202. When the integrated associated score Q(s, r) is acquired, the integrated associated score acquisition unit 202 inputs the acquired integrated associated score Q(s, r) into the information presentation unit 204. The user terminal 200 also acquires the recommended items r from the server apparatus 100 by using a function of the recommended item acquisition unit 203. When the recommended items r are acquired, the recommended item acquisition unit 203 input the acquired recommended items r into the information presentation unit 204. When the integrated associated score Q(s, r) and the recommended items r are input, the information presentation unit 204 presents the recommended items r in descending order of input integrated associated score Q(s, r).

In the foregoing, the functional configuration of the user terminal 200 according to an embodiment of the present technology has been described. The functional configuration of the user terminal 200 shown in FIG. 11 is only an example and modifications such as omission of a portion of the functional configuration and addition of a new functional configuration may be made. For example, the user terminal 200 may be configured to present only integrated associated scores to the user by omitting the recommended item acquisition unit 203. Alternatively, the user terminal 200 may be configured to present the recommended items r to the user in the order in which the recommended items r are provided from the server apparatus 100 by omitting the integrated associated score acquisition unit 202.

In the foregoing, the configuration of a recommendation system has been described.

2-3: Flow of Pre-Processing

Next, the flow of pre-processing performed before recommendation processing according to an embodiment of the present technology will be described. The pre-processing described below is mainly performed by the server apparatus 100.

2-3-1: Derivation Method of a Correction Function

Figure 12:
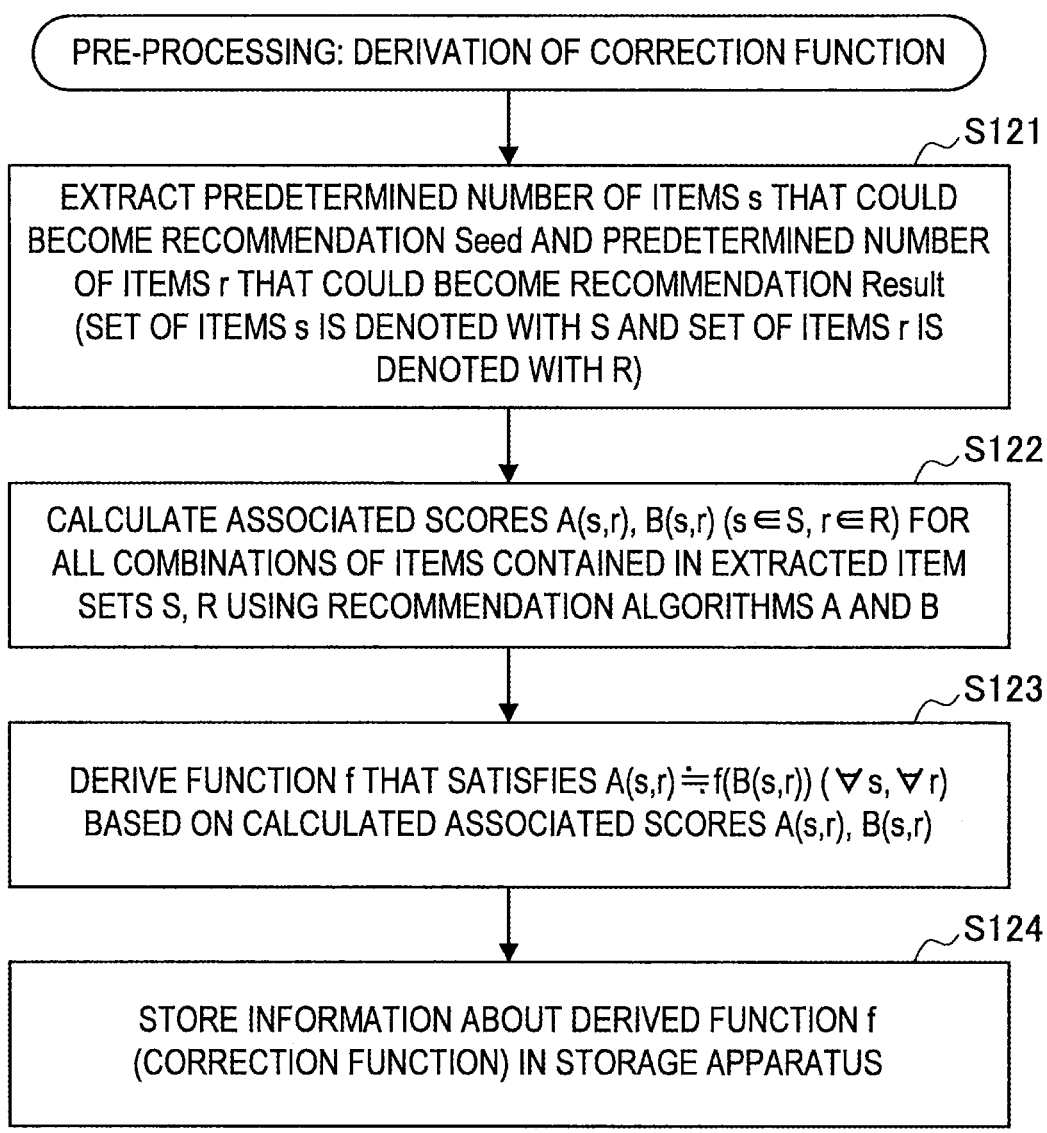
FIG. 12 is an explanatory view illustrating a derivation method of a correction function according to an embodiment of the present technology.

First, the derivation method of a correction function according to an embodiment of the present technology will be described with reference to FIG. 12. FIG. 12 is an explanatory view illustrating the derivation method of a correction function according to an embodiment of the present technology.

As shown in FIG. 12, the server apparatus 100 first extracts a predetermined number of items s that could become a recommendation Seed (seed item) and a predetermined number of items r that could become a recommendation Result (recommended item) through the function of the individual associated score calculation units 101 (step S121). A set of the items s is denoted as S and a set of the items r is denoted as R. Next, the server apparatus 100 calculates the associated scores A(s, r) and B(s, r) for all combinations of s∈S and r∈R through the function of the individual associated score calculation units 101 (step S122). Next, the server apparatus 100 derives a correction function f through the function of the correction function generation unit 102 so that the associated scores have a relationship $A(s, r) \approx f(B(s, r))(\forall s \in S, \forall r \in R)$ (step S123). Next, the server apparatus 100 stores the correction function f derived in step S123 in the storage apparatus 130 through the function of the correction function generation unit 102 (step S124).

In the foregoing, the derivation method of a correction function according to an embodiment of the present technology has been described.

2-3-2: Setting Method of a Weight

Figure 13:
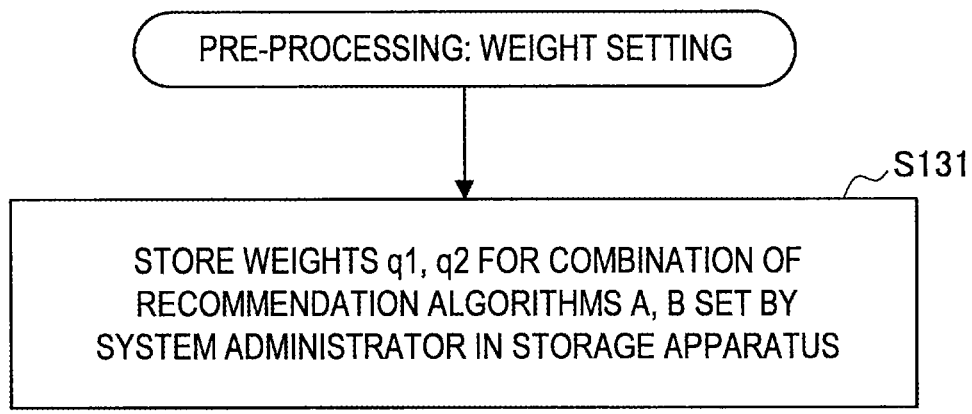
FIG. 13 is an explanatory view illustrating a setting method of a weight according to an embodiment of the present technology.

Next, the setting method of a weight according to an embodiment of the present technology will be described with reference to FIG. 13. FIG. 13 is an explanatory view illustrating the setting method of a weight according to an embodiment of the present technology.

As shown in FIG. 13, the server apparatus 100 stores the weights q1, q2 set by the system administrator for combinations of recommendation algorithms in the storage apparatus 130 (step S131). The system administrator inputs the weights q1, q2 by using the administrator terminal 20. The weights q1, q2 input into the administrator terminal 20 are input into the server apparatus 100 via the network 10. Then, the weights q1, q2 input into the server apparatus 100 are stored, as described above, in the storage apparatus 130. The setting method of the weights q1, q2 described here is the setting method of weights in the pre-processing. The adjustment method of the weights q1, q2 in accordance with user's feedback will be described in detail later.

In the foregoing, the setting method of the weight according to an embodiment of the present technology has been described.

2-4: Flow of Recommendation Processing

Figure 14:
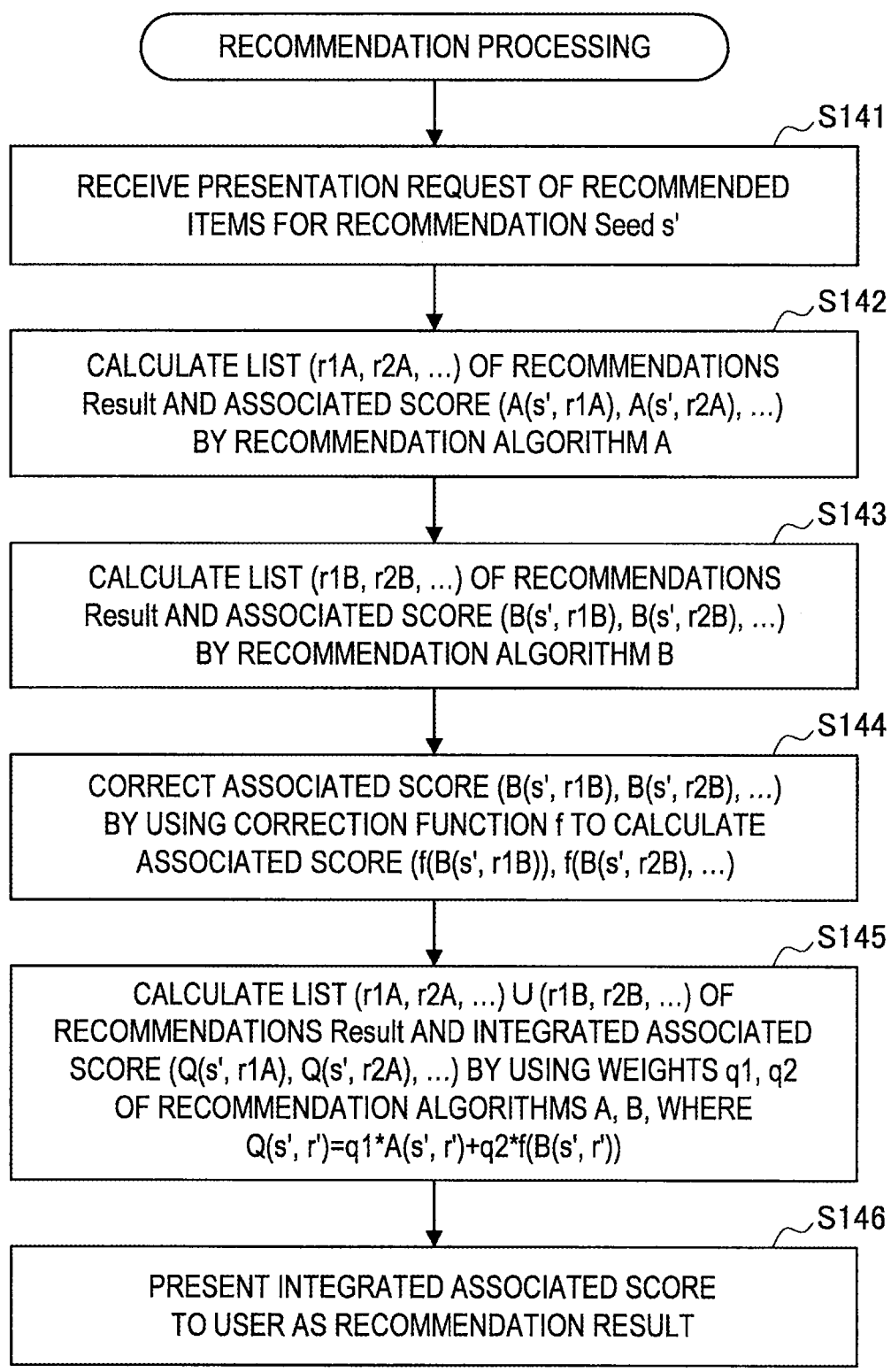
FIG. 14 is an explanatory view illustrating a flow of recommendation processing according to an embodiment of the present technology.

Next, the flow of recommendation processing according to an embodiment of the present technology will be described with reference to FIG. 14. FIG. 14 is an explanatory view illustrating the flow of recommendation processing according to an embodiment of the present technology. The recommendation processing described below is mainly performed by the server apparatus 100.

If the user gives feedback on a recommendation Seed s' (seed item s'), as shown in FIG. 14, the server apparatus 100 receives a presentation request of recommended items for the seed item s' from the user terminal 200 (step S141). When the presentation request of recommended items is received, the server apparatus 100 calculates associated scores A(s', r1A), A(s', r2A), . . . indicating the relationship between the seed item s' and recommended item candidates r1A, r2A, . . . by using the first recommendation algorithm A through the function of the individual associated score calculation units 101 (step S142). Next, the server apparatus 100 calculates associated scores B(s', r1B), B(s', r2B), . . . indicating the relationship between the seed item s' and recommended item candidates r1B, r2B, . . . by using the second recommendation algorithm B through the function of the individual associated score calculation units 101 (step S143).

Next, the server apparatus 100 corrects the associated scores B(s', r1B), B(s', r2B), . . . by using the correction function f through the function of the individual associated score correction unit 103 to calculate new associated scores B'(s', r1B), B'(s', r2B), . . . (step S144). B'(s', r1B) is defined as f(B(s', r1B)) and B'(s', r2B) is defined as f(B(s', r2B)). Next, the server apparatus 100 calculates integrated associated scores Q(s', r1A), Q(s', r2A), . . . , Q(s', r1B), Q(s', r2B), . . . by using the weights q1, q2 through the function of the integrated associated score calculation unit 104 (step S145). Next, the server apparatus 100 provides the integrated associated scores Q(s', r1A), Q(s', r2A), . . . , Q(s', r1B), Q(s', r2B), . . . calculated in step S145 to the user terminal 200 through the function of the integrated associated score calculation unit 104 (step S146).

In the foregoing, the flow of recommendation processing according to an embodiment of the present technology has been described. The description has been provided by focusing on calculation processing of integrated associated scores and highly precise item recommendation can be realized by recommending items with a high integrated associated score.

Concrete Example

Figure 15:
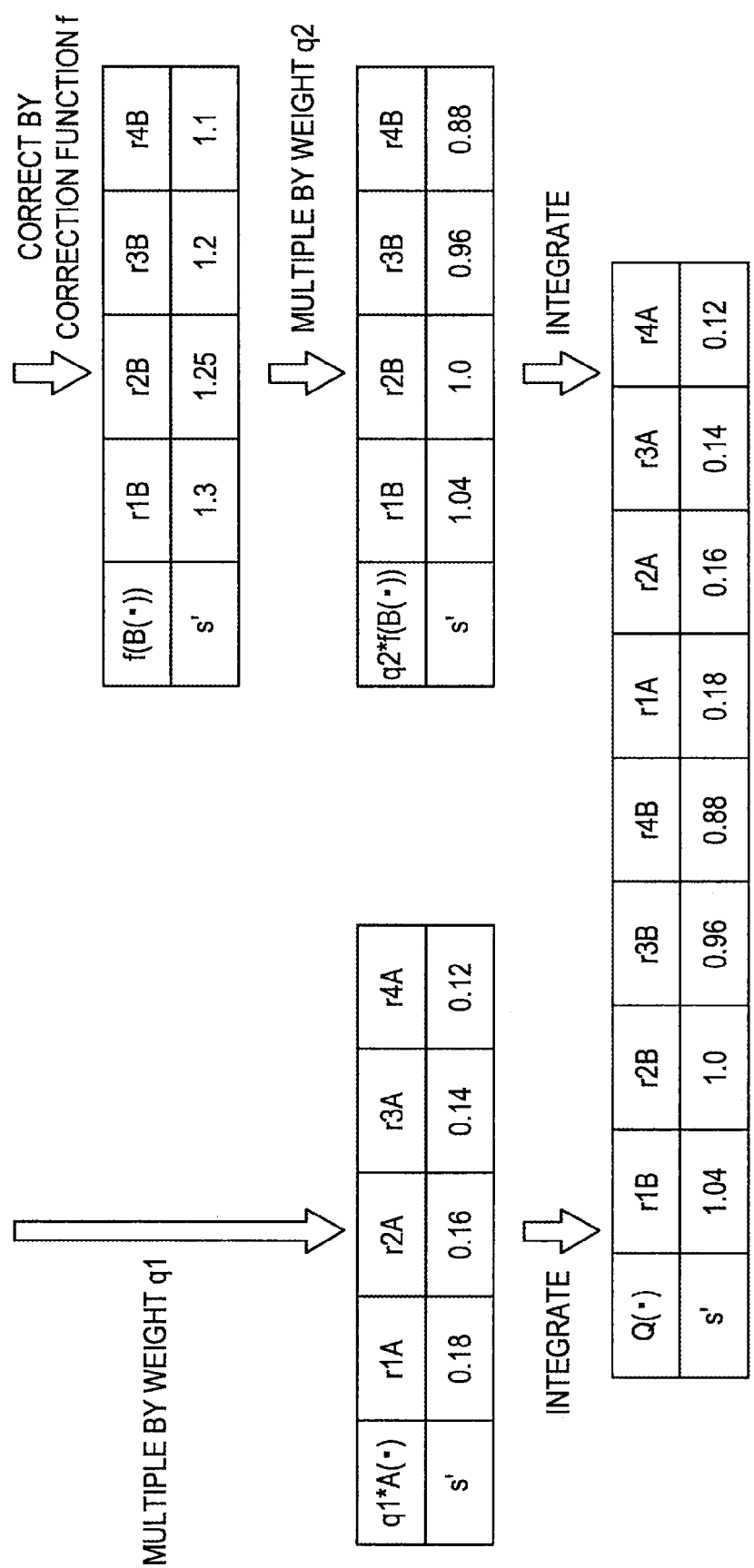
FIG. 15 is an explanatory view illustrating a calculation method of an integrated associated score according to an embodiment of the present technology.

The calculation method of an integrated associated score will be described with reference to FIG. 15 by citing a concrete example. In the example of FIG. 15, associated scores (A(s', r1A), A(s', r2A), A(s', r3A), A(s', r4A))=(0.9, 0.8, 0.7, 0.6) are calculated for the seed item s' by the first recommendation algorithm A. Also, associated scores (B(s', r1B), B(s', r2B), B(s', r3B), B(s', r4B))=(0.08, 0.075, 0.07, 0.06) are calculated for the seed item s' by the second recommendation algorithm B. It is assumed that the weights are set as q1=0.2 and q2=0.8. Further, it is assumed that the correction function f(X)=10*X+0.5 is obtained by pre-processing.

In this case, the integrated associated score calculation unit 104 calculates (q1*A(s', r1A), q1*A(s', r2A), q1*A(s', r3A), q1*A(s', r4A))=(0.18, 0.16, 0.14, 0.12) by multiplying the associated score A(•) by q1. The individual associated score correction unit 103 corrects the associated score B(•) by using the correction function f to calculate (f(B(s', r1B)), f(B(s', r2B)), f(B(s', r3B)), f(B(s', r4B)))=(1.3, 1.25, 1.2, 1.1). Next, the integrated associated score calculation unit 104 multiplies the associated score f(B(•)) by q2 to calculate (q2*f(B(s', r1B)), q2*f(B(s', r2B)), q2*f(B(s', r3B)), q2*f(B(s', r4B)))= (1.04, 1.0, 0.96, 0.88).

Figure 17:
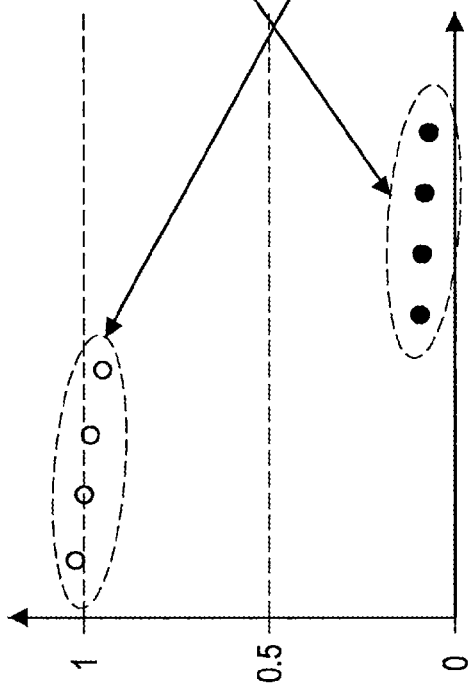
FIG. 17 is an explanatory view illustrating an effect gained when a correction method of the associated score according to an embodiment of the present technology is applied.

Next, the integrated associated score calculation unit 104 calculates an integrated associated score Q(•) by integrating weighted associated scores q1*A(•) and q2*f(B(•)). More specifically, the integrated associated score calculation unit 104 calculates Q(•)=q1*A(•)+q2*f(B(•)). In the example of FIG. 15, the calculation yields (Q(s', r1B), Q(s', r2B), Q(s', r3B), Q(s', r4B), Q(s', r1A), Q(s', r2A), Q(s', r3A), Q(s', r4A))=(1.04, 1.0, 0.96, 0.88, 0.18, 0.16, 0.14, 0.12) If the associated score BO is not corrected by the correction function f, as shown in FIG. 16, q1*A(•)>q2*B(•) holds even if q1<q2. On the other hand, if the associated score B(•) is corrected by the correction function f, as shown in FIG. 17, q1*A(•)<q2*f(B(•)) holds.

If the system administrator sets the weights like q1<q2, the system administrator attaches more importance to the second recommendation algorithm B than the first recommendation algorithm A. However, if the associated score B(•) is not corrected by the correction function f, as shown in FIG. 16, contrary to the intention of the system administrator, the first recommendation algorithm A may be predominant. On the other hand, if the associated score B(•) is corrected by the correction function f, as shown in FIG. 17, an appropriate result can be obtained without being affected by a difference of score systems even if the score systems are significantly different like this example. As a result, plural recommendation algorithms can be combined while the intention contained in the weight setting being appropriately being reflected.

In the foregoing, the flow of recommendation processing according to an embodiment of the present technology has been described.

3: EXTENSION EXAMPLE

Heretofore, the method of combining two recommendation algorithms has been described. However, the method according to an embodiment of the present technology can be extended to a method of combining three or more recommendation algorithms. Thus, the method of combining three recommendation algorithms (hereinafter, called the present extension example) will be described.

3-1: Flow of Pre-Processing

First, the flow of pre-processing performed before recommendation processing according to the present extension example will be described. The pre-processing described below is mainly performed by the server apparatus 100.

3-1-1: Derivation Method of a Correction Function

Figure 18:
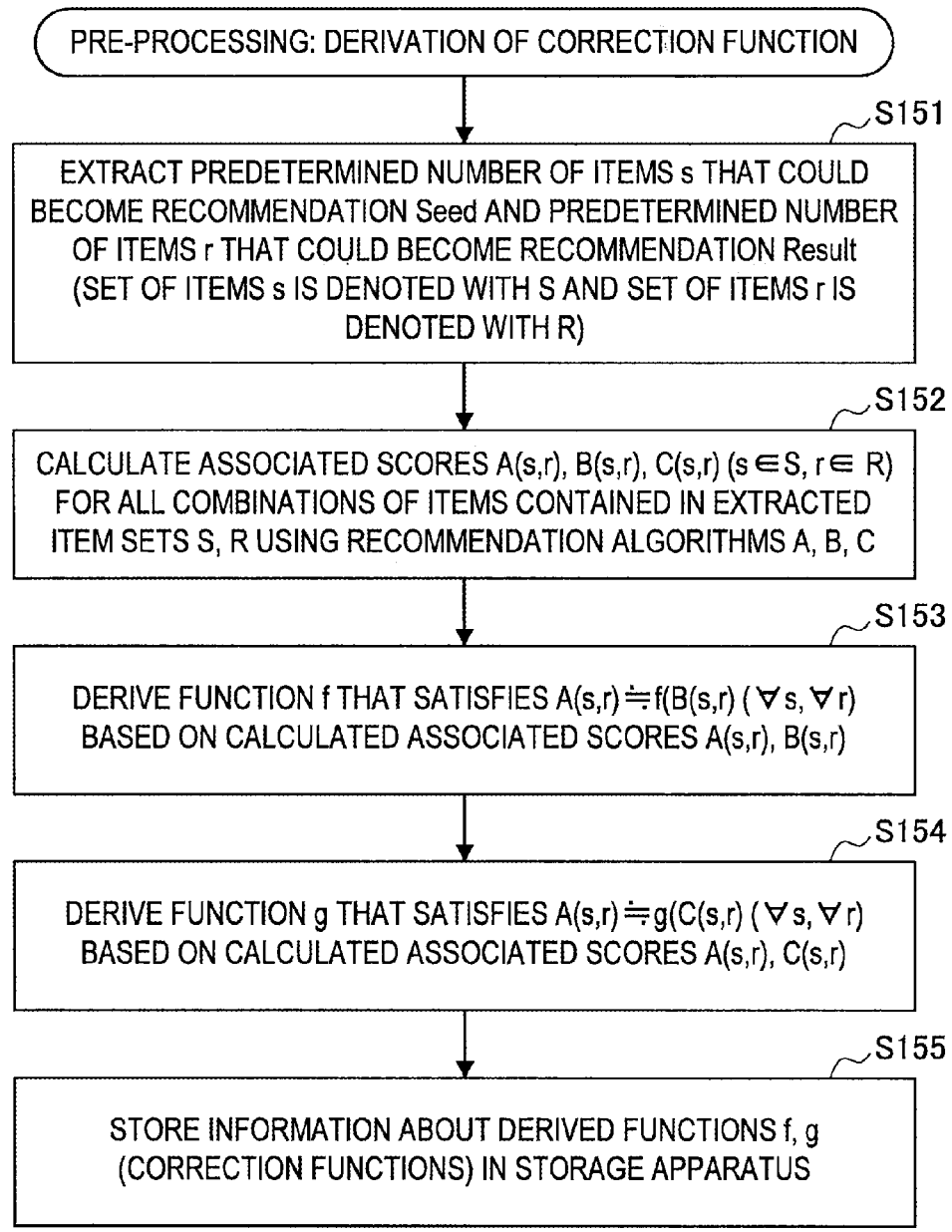
FIG. 18 is an explanatory view illustrating the derivation method (extension example) of the correction function according to an embodiment of the present technology.

First, the derivation method of a correction function according to the present extension example will be described with reference to FIG. 18. FIG. 18 is an explanatory view illustrating the derivation method of a correction function according to the present extension example.

As shown in FIG. 18, the server apparatus 100 first extracts a predetermined number of items s that could become a recommendation Seed (seed item) and a predetermined number of items r that could become a recommendation Result (recommended item) through the function of the individual associated score calculation units 101 (step S151). A set of the items s is denoted as S and a set of the items r is denoted as R. Next, the server apparatus 100 calculates the associated scores A(s, r), B(s, r) and C(s, r) for all combinations of s∈S and r∈R through the function of the individual associated score calculation units 101 (step S152).

Next, the server apparatus 100 derives a correction function f through the function of the correction function generation unit 102 so that the associated scores have a relationship A(s, r)≈f(B(s, r))(∀s∈S, ∀r∈R) (step S153). Next, the server apparatus 100 derives a correction function g through the function of the correction function generation unit 102 so that the associated scores have a relationship A(s, r)≈g(C(s, r)) (∀s∈S, ∀r∈R) (step S154). Next, the server apparatus 100 stores the correction functions f and g derived in steps S153 and S154 in the storage apparatus 130 through the function of the correction function generation unit 102 (step S155).

In the foregoing, the derivation method of a correction function according to the present extension example has been described.

3-1-2: Setting Method of a Weight

Figure 19:
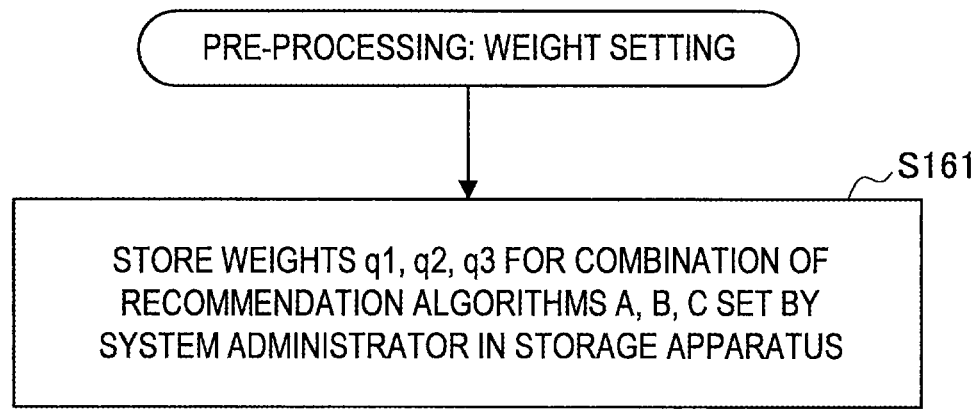
FIG. 19 is an explanatory view illustrating a setting method (extension example) of the weight according to an embodiment of the present technology.

Next, the setting method of the weight according to the present extension example will be described with reference to FIG. 19. FIG. 19 is an explanatory view illustrating the setting method of the weight according to the present extension example.

As shown in FIG. 19, the server apparatus 100 stores the weights q1, q2, q3 set by the system administrator for combinations of recommendation algorithms in the storage apparatus 130 (step S161). The system administrator inputs the weights q1, q2, q3 by using the administrator terminal 20. The weights q1, q2, q3 input into the administrator terminal 20 are input into the server apparatus 100 via the network 10. Then, the weights q1, q2, q3 input into the server apparatus 100 are stored, as described above, in the storage apparatus 130. The setting method of the weights q1, q2, q3 described here is the setting method of weights in the pre-processing. The weights q1, q2, q3 set here may be corrected in accordance with user's feedback.

In the foregoing, the setting method of the weight according to the present extension example has been described.

3-2: Flow of Recommendation Processing

Figure 20:
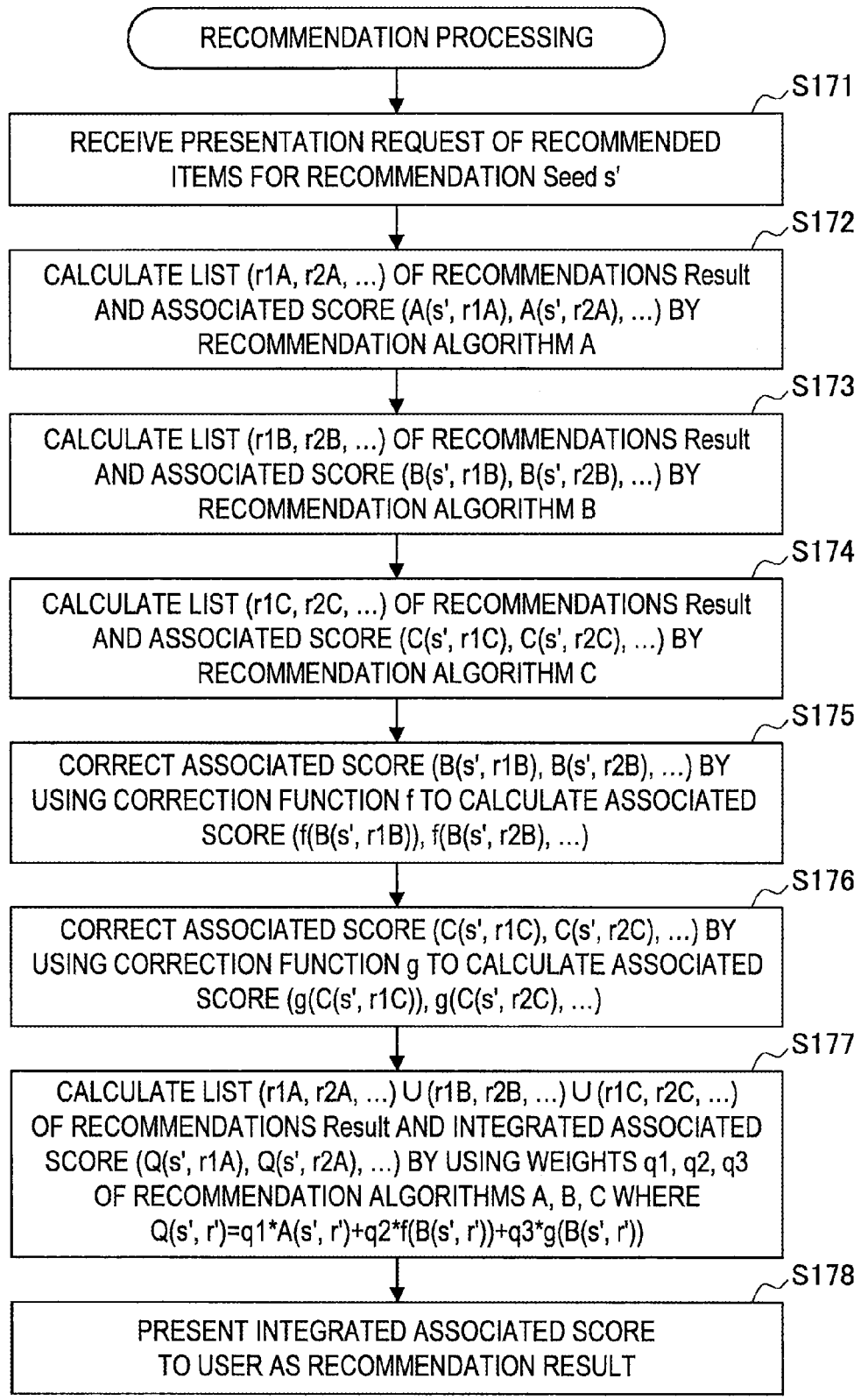
FIG. 20 is an explanatory view illustrating the flow (extension example) of recommendation processing according to an embodiment of the present technology.

Next, the flow of recommendation processing according to the present extension example will be described with reference to FIG. 20. FIG. 20 is an explanatory view illustrating the flow of recommendation processing according to the present extension example. The recommendation processing described below is mainly performed by the server apparatus 100.

If the user gives feedback on a recommendation Seed s' (seed item s'), as shown in FIG. 20, the server apparatus 100 receives a presentation request of recommended items for the seed item s' from the user terminal 200 (step S171). When the presentation request of recommended items is received, the server apparatus 100 calculates associated scores A(s', r1A), A(s', r2A), . . . indicating the relationship between the seed item s' and recommended item candidates r1A, r2A, . . . by using the first recommendation algorithm A through the function of the individual associated score calculation units 101 (step S172).

Next, the server apparatus 100 calculates associated scores B(s', r1B), B(s', r2B), . . . indicating the relationship between the seed item s' and recommended item candidates r1B, r2B, . . . by using the second recommendation algorithm B through the function of the individual associated score calculation units 101 (step S173). Next, the server apparatus 100 calculates associated scores C(s', r1C), C(s', r2C), . . . indicating the relationship between the seed item s' and recommended item candidates r1C, r2C, . . . by using the third recommendation algorithm C through the function of the individual associated score calculation units 101 (step S174).

Next, the server apparatus 100 corrects the associated scores B(s', r1B), B(s', r2B), . . . by using the correction function f through the function of the individual associated score correction unit 103 to calculate new associated scores B'(s', r1B), B'(s', r2B), . . . (step S175). B'(s', r1B) is defined as f(B(s', r1B)) and B'(s', r2B) is defined as f(B(s', r2B)). Next, the server apparatus 100 corrects the associated scores C(s', r1C), C(s', r2C), . . . by using the correction function g through the function of the individual associated score correction unit 103 to calculate new associated scores C'(s', r1C), C'(s', r2C), . . . (step S176). C'(s', r1C) is defined as g(C(s', r1C)) and C'(s', r2C) is defined as g(C(s', r2C)).

Next, the server apparatus 100 calculates, based on Formula (5) below, integrated associated scores Q(s', r1A), Q(s', r2A), . . . , Q(s', r1B), Q(s', r2B), . . . Q(s', r1C), Q(s', r2C), . . . by using the weights q1, q2, q3 through the function of the integrated associated score calculation unit 104 (step S177). Next, the server apparatus 100 provides the integrated associated scores Q(s', r1A), Q(s', r2A), . . . , Q(s', r1B), Q(s', r2B), . . . Q(s', r1C), Q(s', r2C), . . . calculated in step S177 to the user terminal 200 through the function of the integrated associated score calculation unit 104 (step S178).

$$Q(s',r')=q1*A(s',r')+q2*f(B(s',r'))+q3*g(C(s',r')) \quad (5)$$

In the foregoing, the flow of recommendation processing according to the present extension example has been described. The description has been provided by focusing on calculation processing of integrated associated scores and highly precise item recommendation can be realized by recommending items with a high integrated associated score.

4: ADJUSTMENT METHOD OF WEIGHT ACCORDING TO FEEDBACK

Heretofore, a detailed description of the method of adjusting the weight in accordance with user's feedback has been left out. The adjustment method of the weight that has been left out will be described below. The adjustment method of the weight described below is realized mainly by the function of the weight adjustment unit 106 of the functions of the server apparatus 100.

4-1: Adjustment Method of System Weight

The weight considered here includes a weight commonly used throughout the system (hereinafter, called a system weight) and a weight individualized for each user (hereinafter, called a user weight). First, the adjustment method of the system weight will be described. Adjustment processing of the system weight is mainly performed by the system weight correction unit 1061.

4-1-1: Adjustment Example #1

Figure 21:
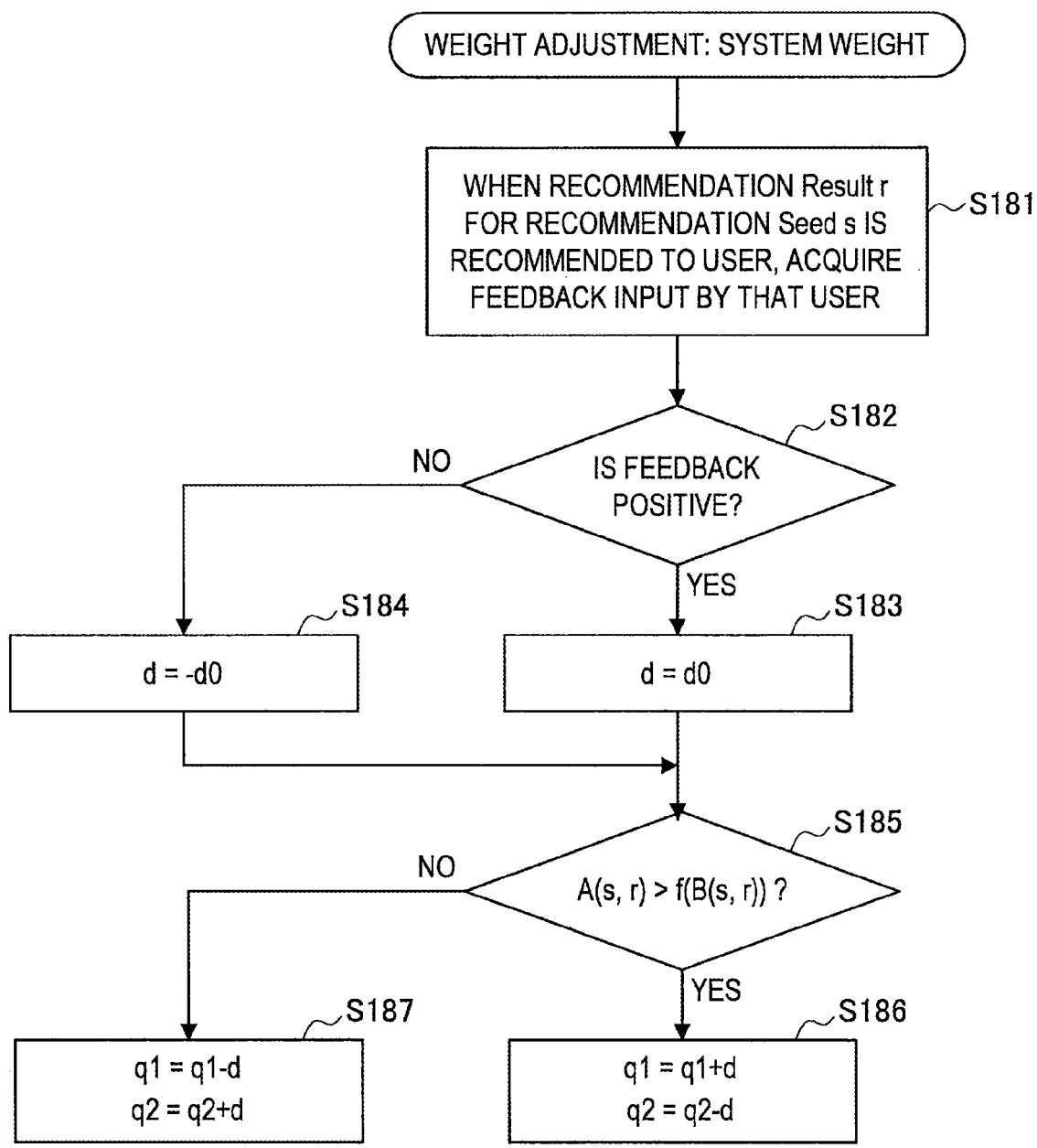
FIG. 21 is an explanatory view illustrating an adjustment method of the weight according to an embodiment of the present technology.

First, an example (adjustment example #1) of the adjustment method of the system weight according to an embodiment of the present technology will be described with reference to FIG. 21. FIG. 21 is an explanatory view illustrating an example (adjustment example #1) of the adjustment method of the system weight according to an embodiment of the present technology.

As shown in FIG. 21, when a recommendation Result r (recommended item r) for a recommendation Seed s (seed item s) is recommended to a user, the server apparatus 100 first acquires feedback input by the user (step S181). Next, the server apparatus 100 determines whether or not the acquired feedback is feedback indicating a positive trend through the function of the feedback determination unit 107 (step S182). If the acquired feedback is determined to be feedback indicating a positive trend, the server apparatus 100 proceeds to step S183. On the other hand, if the acquired feedback is determined not to be feedback indicating a positive trend, the server apparatus 100 proceeds to step S184.

If the processing proceeds to step S183, the system weight correction unit 1061 sets a correction amount d of weight as d=d0 (step S183). On the other hand, if the processing proceeds to step S184, the system weight correction unit 1061 sets the correction amount d of weight as d=−d0 (step S184). It is assumed that the fluctuation d0 of the weight is set by the system administrator in advance.

When the processing in step S183 or S184 is completed, the server apparatus 100 proceeds to step S185. When the processing proceeds to step S185, the system weight correction unit 1061 determines whether the two associated scores A(s, r) and B(s, r) satisfy the condition of A(s, r)>f(B(s, r)) (step S185). If the condition of A(s, r)>f(B(s, r)) is determined to be satisfied, the server apparatus 100 proceeds to step S186. On the other hand, if the condition of A(s, r)>f(B(s, r)) is determined not to be satisfied, the server apparatus 100 proceeds to step S187.

If the processing proceeds to step S186, the system weight correction unit 1061 corrects the weights q1, q2 based on Formula (6) below (step S186). On the other hand, if the processing proceeds to step S187, the system weight correction unit 1061 corrects the weights q1, q2 based on Formula (7) below (step S187). When the processing in step S186 or S187 is completed, the server apparatus 100 terminates a sequence of processing related to adjustments of the system weight.

$$q1=q1-d, q2=q2+d \quad (6)$$

$$q1=q1+d, q2=q2-d \quad (7)$$

Concrete Example

Figure 22:
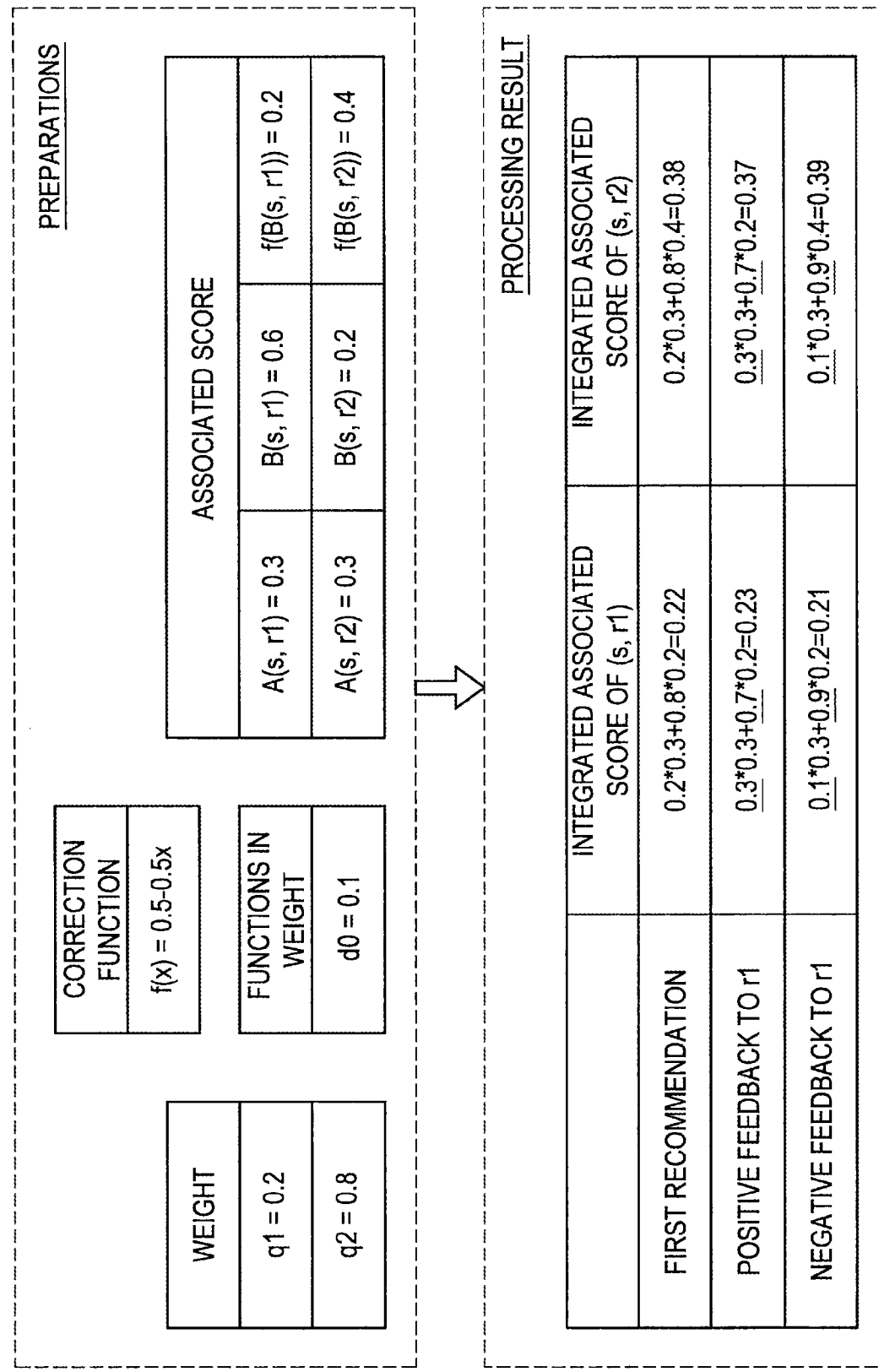
FIG. 22 is an explanatory view illustrating the adjustment method of the weight according to an embodiment of the present technology.

A concrete example of the adjustment method of the system weight will be described with reference to FIG. 22. For example, the weights set by the system administrator are assumed to be q1=0.2 and q2=0.8 and the fluctuation of the weight to be d0=0.1. It is also assumed that the correction function is f(X)=0.5−0.5X and the associated scores are A(s, r1)=0.3, A(s, r2)=0.3, B(s, r1)=0.6, and B(s, r2)=0.2. In this case, f(B(s, r1))=0.2 and f(B(s, r2))=0.4 are obtained. If the weights are not adjusted, as shown in FIG. 22, the integrated associated scores Q(•) are obtained as Q(s, r1)=0.22 and Q(s, r2)=0.38. The server apparatus 100 recommends items r1, r2 to the user based on these integrated associated scores Q(•).

Then, when the user gives feedback on r1, the server apparatus 100 corrects the weights q1, q2 (system weights). If the feedback indicates a positive trend, in the example of FIG. 22, the server apparatus 100 increases the weight q1 by which the associated score A(•) is multiplied by d0 and decreases the weight q2 by which the associated score B(•) is multiplied by d0. On the other hand, if the feedback indicates a negative trend, in the example of FIG. 22, the server apparatus 100 decreases the weight q1 by which the associated score A(•) is multiplied by d0 and increases the weight q2 by which the associated score B(•) is multiplied by d0.

According to an embodiment of the present technology, the system weights q1, q2 can be adjusted by the above method in accordance with user's feedback on recommended items.

4-1-2: Adjustment Example #2

Figure 23:
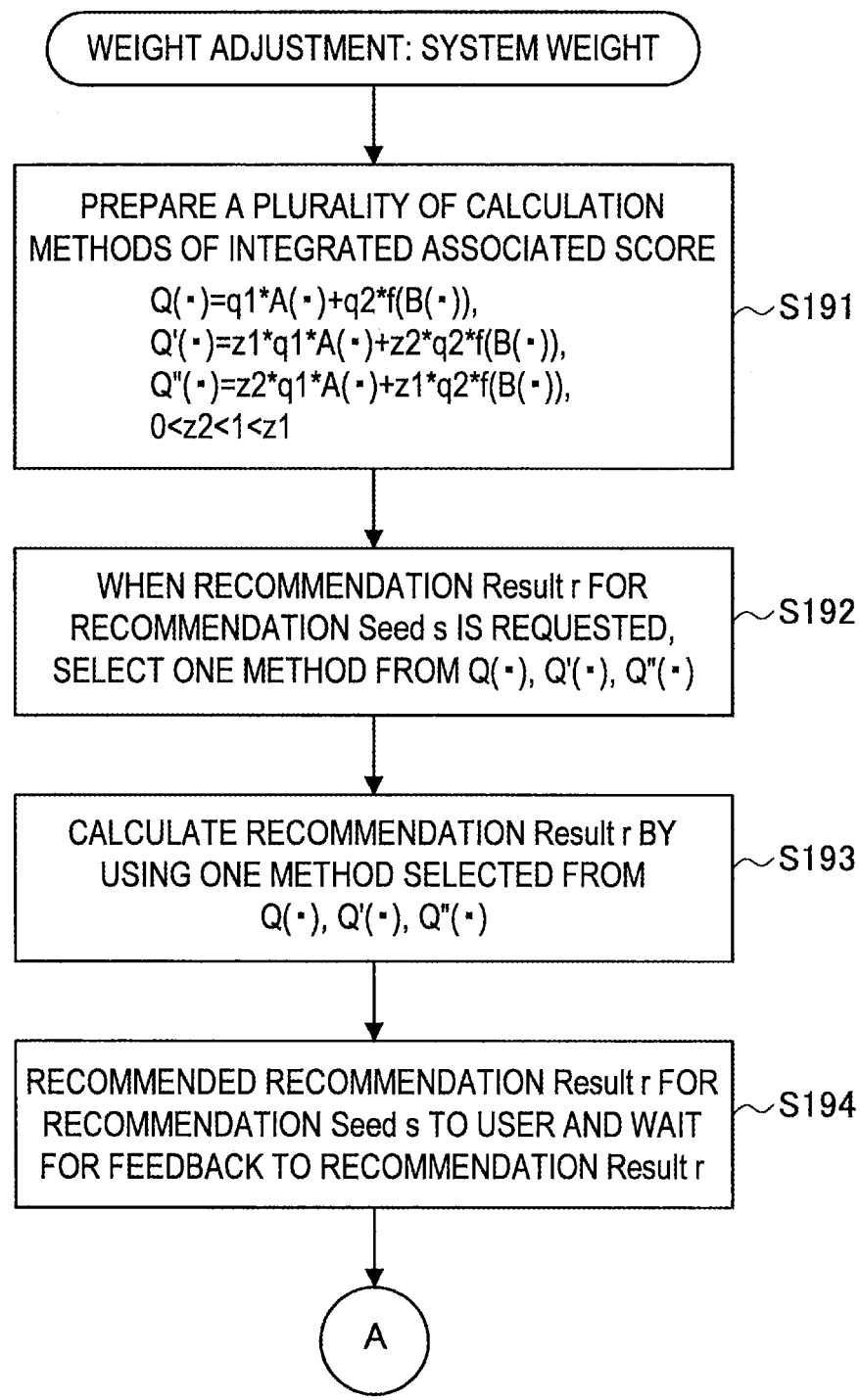
FIG. 23 is an explanatory view illustrating the adjustment method of the weight according to an embodiment of the present technology.
Figure 24:
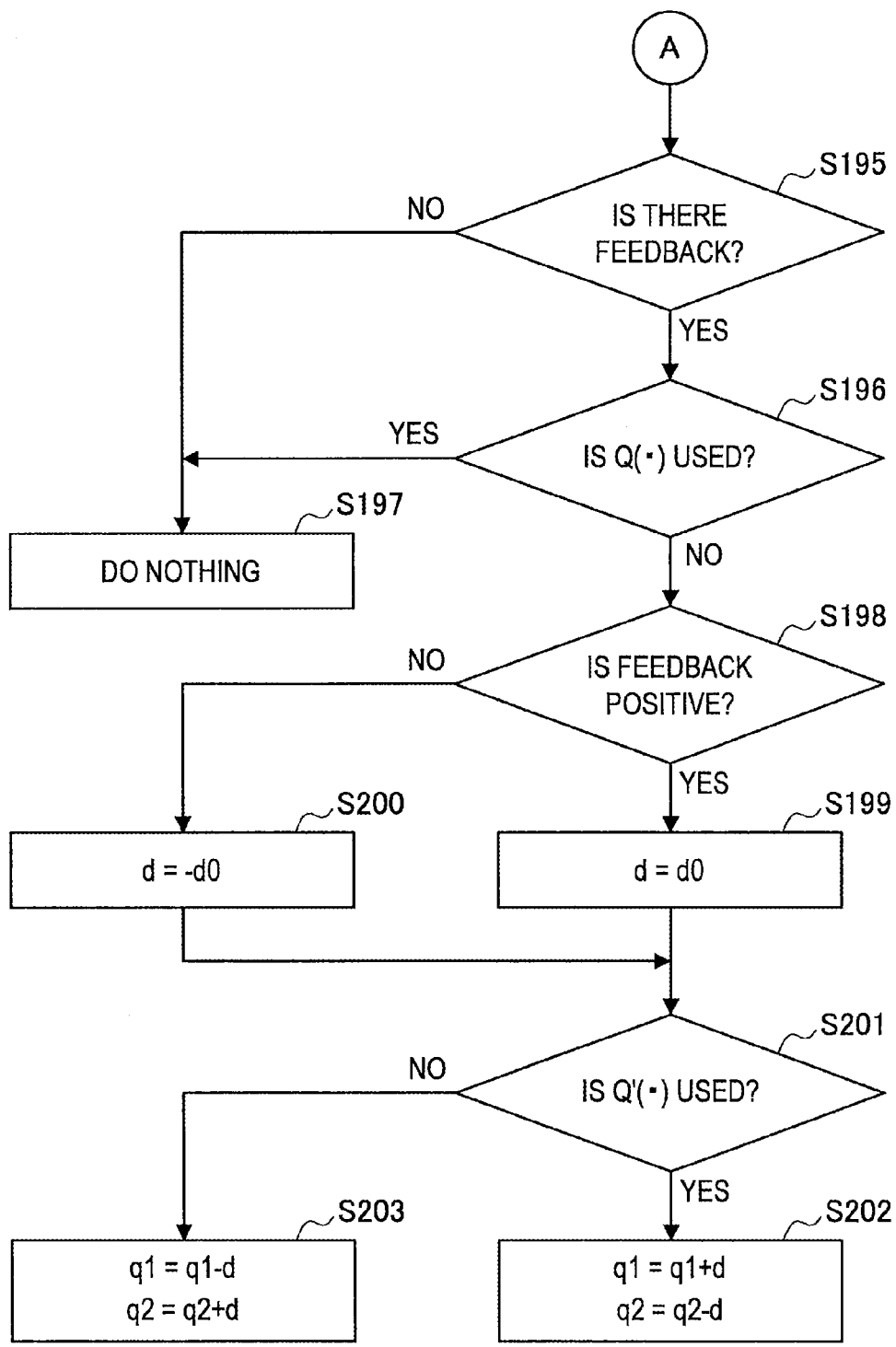
FIG. 24 is an explanatory view illustrating the adjustment method of the weight according to an embodiment of the present technology.

Next, an example (adjustment example #2) of the adjustment method of the system weight according to an embodiment of the present technology will be described with reference to FIGS. 23 and 24. FIGS. 23 and 24 are explanatory views illustrating an example (adjustment example #2) of the adjustment method of the system weight according to an embodiment of the present technology.

As shown in FIG. 23, the server apparatus 100 first prepares plural calculation methods of the integrated associated score through the function of the weight adjustment unit 106 (step S191). For example, three calculation methods shown as Formulas (8) to (10) below are prepared. z1 and z2 are predetermined coefficients satisfying the condition 0<z2<1<z1. After the plural calculation methods of the integrated associated score being prepared, the server apparatus 100 selects one calculation method of the integrated associated score when presentation of recommendation Results (recommended items) for the recommendation Seed s (seed item s) is requested (step S192). Next, the server apparatus 100 calculates integrated associated scores by using the calculation method selected in step S192 and recommends the recommended item r based on the calculation results (step S194).

$$Q(\bullet)=q1*A(\bullet)+q2*f(B(\bullet)) \quad (8)$$

$$Q'(\bullet)=z1*q1*A(\bullet)+z2*q2*f(B(\bullet)) \quad (9)$$

$$Q''(\bullet)=z2*q1*A(\bullet)+z1*q2*f(B(\bullet)) \quad (10)$$

Next, as shown in FIG. 24, the server apparatus 100 waits for feedback on the recommended item r and determines whether feedback is received (step S195). If feedback is received, the server apparatus 100 proceeds to step S196. On the other hand, no feedback is received, the server apparatus 100 proceeds to step S197. For example, the server apparatus 100 waits for feedback for a predetermined time after the recommended item r being recommended to the user and if no feedback is received after the predetermined time passes, the server apparatus 100 proceeds to step S197.

If the processing proceeds to step S196, the server apparatus 100 determines whether the method shown in Formula (8) above (hereinafter, the method of Q(•)) is used as the calculation method of the integrated associated score in step S193 (see FIG. 23) (step S196). If the method of Q(•) is used as the calculation method of the integrated associated score, the server apparatus 100 proceeds to step S197. On the other hand, if the method of Q(•) is not used as the calculation method of the integrated associated score, the server apparatus 100 proceeds to step S198. If the processing proceeds to step S197, the server apparatus 100 does nothing about adjustments of the weights q1, q2 (step S197).

If the processing proceeds to step S198, the server apparatus 100 determines whether feedback indicates a positive trend through the function of the feedback determination unit 107 (step S198). If the feedback is determined to indicate a positive trend, the server apparatus 100 proceeds to step S199. On the other hand, if the feedback is determined not to indicate a positive trend, the server apparatus 100 proceeds to step S200.

If the processing proceeds to step S199, the system weight correction unit 1061 sets the correction amount d of weight as d=d0 (step S199). On the other hand, if the processing proceeds to step S200, the system weight correction unit 1061 sets the correction amount d of weight as d=−d0 (step S200). It is assumed that the fluctuation d0 of the weight is set by the system administrator in advance.

When the processing in step S199 or S200 is completed, the server apparatus 100 proceeds to step S201. When the processing proceeds to step S201, the system weight correction unit 1061 determines whether Q'(•) is used (step S201). If Q'(•) is used, the server apparatus 100 proceeds to step S202. On the other hand, if Q'(•) is not used, the server apparatus 100 proceeds to step S203. Recommendation results using Q'(•) are results in which the associated score A(•) is stressed. Thus, if feedback on a recommendation result using Q'(•) is given, a recommendation result more suitable to user's preferences can be obtained by increasing the weight attached to the associated score A(•).

If the processing proceeds to step S202, the system weight correction unit 1061 corrects the weights q1, q2 based on Formula (6) above (step S202). On the other hand, if the processing proceeds to step S203, the system weight correction unit 1061 corrects the weights q1, q2 based on Formula (7) above (step S203). When the processing in step S202 or S203 is completed, the server apparatus 100 terminates a sequence of processing related to adjustments of the system weight.

In the foregoing, the adjustment method of the system weight according to an embodiment of the present technology has been described. The method in which system weights are adjusted each time user's feedback is received is shown in the above description, but the adjustment timing of the system weights may be changed as shown below. For example, a method by which when an opportunity to correct the weight by Formula (6) or (7) above occurs, the number of times of occurrence of such an opportunity is counted and the weight is corrected with a correction amount in accordance with the count can be considered.

If, for example, a number of times CU of occurrence of an opportunity to increase the weight q1 exceeds a number times CD of occurrence of an opportunity to decrease the weight q1 (CU>CD) in predetermined timing, the weight q1 is increased by d0 and the weight q2 is decreased by d0. Conversely, if the number of times CU of occurrence of an opportunity to increase the weight q1 falls short of the number times CD of occurrence of an opportunity to decrease the weight q1 (CU<CD) in predetermined timing, the weight q1 is decreased by d0 and the weight q2 is increased by d0. By performing the above processing, calculation costs can be reduced by decreasing the frequency at which the weight is changed and also stable recommendation results can be obtained.

4-2: Adjustment Method of User Weight

Next, the adjustment method of the user weight according to an embodiment of the present technology will be described. Heretofore, the system weights q1, q2 commonly used throughout the system have been described, but an idea of user weights q1'(u), q2'(u) is introduced here. u denotes the index to identify individual users. Moreover, the user weights q1'(u), q2'(u) are different from user to user. When the user weights q1'(u), q2'(u) are considered, the integrated associated score Q(•) is expressed like, for example, Formula (11) or Formula (12) below.

$$Q(\bullet)=(q1+q1')*A(\bullet)+(q2+q2')*f(B(\bullet)) \quad (11)$$

$$Q(\bullet)=(q1*q1')*A(\bullet)+(q2*q2')*f(B(\bullet)) \quad (12)$$

When feedback from a user is received, the server apparatus 100 decides a correction amount by the method shown in FIGS. 21, 23 and 24 to allocate a portion of the correction amount to the system weights q1, q2 and the rest thereof to the user weights q1', q2'. It is assumed that the system administrator sets the ratio of correction amount to both weights in advance. It is preferable to set the ratio of both weights in such a way that a larger correction amount is allocated to the user weights q1', q2'. Further, the ratio of the correction amount allocated to the user weights q1', q2' may be decided in accordance with |A(•)−f(B(•))| or a count difference of feedback |CU−CD|. An increment of the ratio may be proportional to a variation coefficient v^m (v<1) based on the number of times m of feedback.

5: SUPPLEMENTARY DESCRIPTION

Heretofore, an embodiment of the present technology has been described. A configuration that can be added to the description will briefly be described. In addition, a portion of the description will be supplemented.

5-1: Adjustment Method of Weight when Feedback is not Used

In the above description, the method of adjusting weights in accordance with feedback has been described, but a method of adjusting weights without using feedback can also be considered. As one of such methods, a method by which plural weights are prepared to use different weights according to circumstances can be considered.

For example, it is assumed that an item group (hereinafter, called a first item group) of type whose recommendation results are more likely to be stressed by cooperative filtering and an item group (hereinafter, called a second item group) of type whose recommendation results are more likely to be stressed by content-based filtering are present. Suppose that an item that should be stressed for some reason such as campaigns, events, or business reasons belongs to the first item group. In this case, it is preferable to increase the weight of the cooperative filtering and decrease the weight of the content-based filtering.

Consider a more concrete example. When, for example, the cooperative filtering and content-based filtering are combined, a method of decreasing the weight of the cooperative filtering and increasing the weight of the content-based filtering can be considered to stress recommendation results of a new publication on the day of issue.

Incidentally, the adjustment method described here and the above adjustment method of weights by using feedback may be combined.

5-2: Update of Correction Function

In the above description, the update of a correction function is not mentioned. However, a score system may change due to an increase in the number of pieces of metadata attached to items or logs of feedback. In content-based filtering, for example, the score system changes due to an increase in the number of pieces of metadata. In cooperative filtering, on the other hand, the score system changes due to an increase of logs. Thus, the appropriate shape of a correction function is considered to change with the passage of time. Therefore, the server apparatus 100 preferably updates a correction function stored in the storage apparatus 130 by periodically executing regeneration of the correction function through the function of the correction function generation unit 102.

5-3: Items to which No Associated Score is Attached

Incidentally, the associated score for some item may be 0 depending on the type of recommendation algorithms. In such a case, if the calculation method of an integrated associated score described above is used, a value that is smaller by a portion of the integrated associated score for the item is obtained. Therefore, for items whose integrated associated score becomes a small value because no associated score is added by some recommendation algorithm, for example, an integrated associated score may be calculated by using remaining recommendation algorithms excluding the recommendation algorithm that adds no associated score.

In content-based filtering, for example, no associated score is present for items to which metadata is not attached. In such a case, a method by which integrated associated scores are calculated by using another recommendation algorithm such as the cooperative filtering in a period before metadata is accumulated and after the period passes, integrated associated scores are calculated by using plural recommendation algorithms including the content-based filtering can be considered.

In addition, the following method can also be considered. If, for example, the associated score $B(s, r)$ by the second recommendation algorithm B becomes 0, the integrated associated score $Q(s, r)$ is obtained like $Q(s, r)=q1*A(s, r)$. In content-based filtering, for example, no associated score is present for items to which metadata is not attached. Thus, for such an item, the integrated associated score may be calculated by, for example, $Q(s, r)=(q1+q2)*A(s, r)$. Alternatively, the integrated associated score for an item whose associated score $B(s, r)$ is 0 may be adjusted to decrease.

In the foregoing, the configuration according to an embodiment of the present technology has been described.

6: HARDWARE CONFIGURATION EXAMPLE

Figure 25:
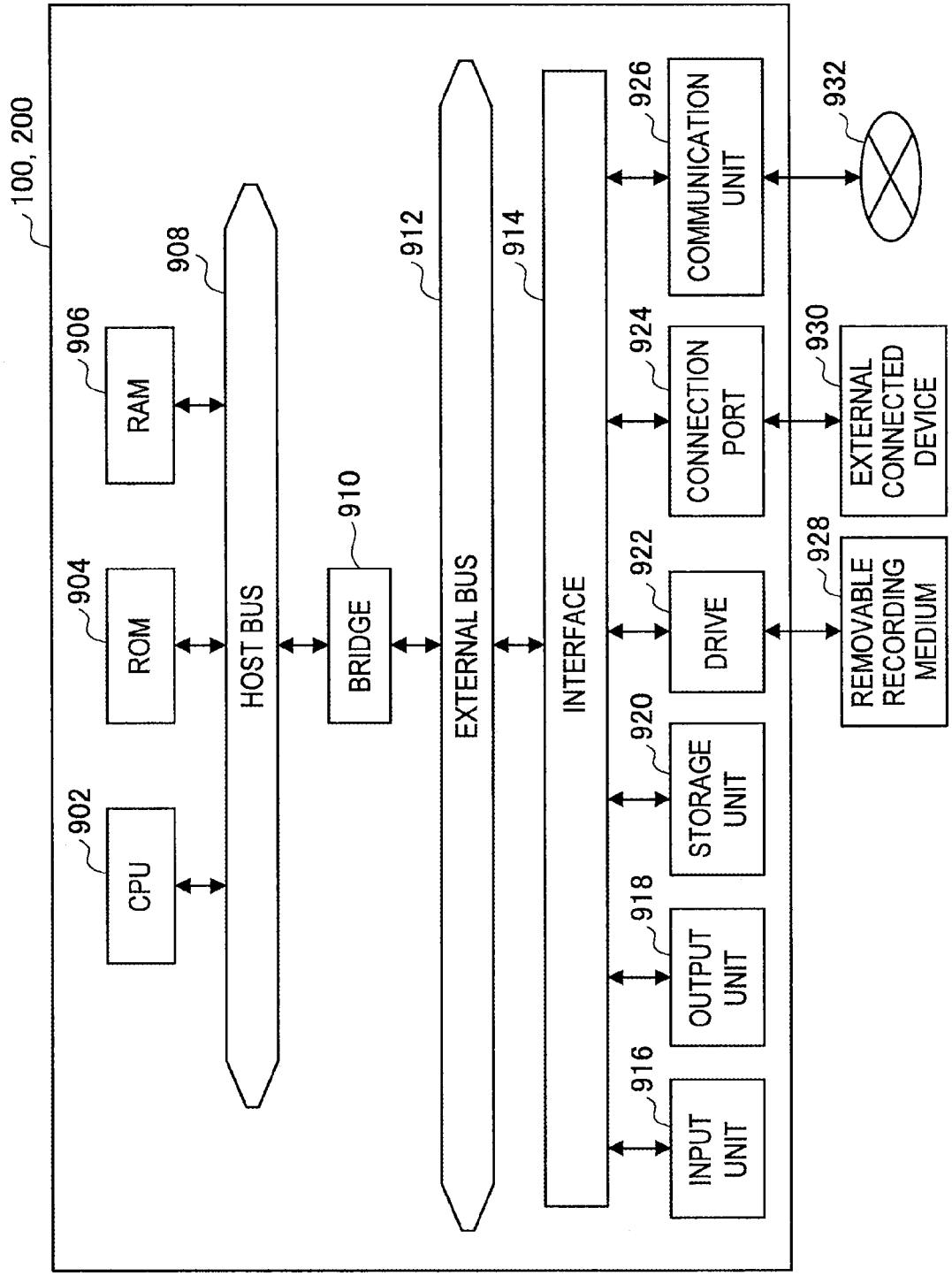
FIG. 25 is an explanatory view illustrating a hardware configuration capable of realizing functions held by the server apparatus and the user terminal according to an embodiment of the present technology.

The function of each structural element of the server apparatus 100 and the user terminal 200 described above can be performed by using, for example, the hardware configuration of the information processing apparatus shown in FIG. 25. That is, the function of each structural element can be realized by controlling the hardware shown in FIG. 25 using a computer program. Additionally, the mode of this hardware is arbitrary, and may be a personal computer, a mobile information terminal such as a mobile phone, a PHS or a PDA, a game machine, or various types of information appliances. Moreover, the PHS is an abbreviation for Personal Handy-phone System. Also, the PDA is an abbreviation for Personal Digital Assistant.

As shown in FIG. 25, this hardware mainly includes a CPU 902, a ROM 904, a RAM 906, a host bus 908, and a bridge 910. Furthermore, this hardware includes an external bus 912, an interface 914, an input unit 916, an output unit 918, a storage unit 920, a drive 922, a connection port 924, and a communication unit 926. Moreover, the CPU is an abbreviation for Central Processing Unit. Also, the ROM is an abbreviation for Read Only Memory. Furthermore, the RAM is an abbreviation for Random Access Memory.

The CPU 902 functions as an arithmetic processing unit or a control unit, for example, and controls entire operation or a part of the operation of each structural element based on various programs recorded on the ROM 904, the RAM 906, the storage unit 920, or a removal recording medium 928. The ROM 904 is means for storing, for example, a program to be loaded on the CPU 902 or data or the like used in an arithmetic operation. The RAM 906 temporarily or perpetually stores, for example, a program to be loaded on the CPU 902 or various parameters or the like arbitrarily changed in execution of the program.

These structural elements are connected to each other by, for example, the host bus 908 capable of performing high-speed data transmission. For its part, the host bus 908 is connected through the bridge 910 to the external bus 912 whose data transmission speed is relatively low, for example. Furthermore, the input unit 916 is, for example, a mouse, a keyboard, a touch panel, a button, a switch, or a lever. Also, the input unit 916 may be a remote control that can transmit a control signal by using an infrared ray or other radio waves.

The output unit 918 is, for example, a display device such as a CRT, an LCD, a PDP or an ELD, an audio output device such as a speaker or headphones, a printer, a mobile phone, or a facsimile, that can visually or auditorily notify a user of acquired information. Moreover, the CRT is an abbreviation for Cathode Ray Tube. The LCD is an abbreviation for Liquid Crystal Display. The PDP is an abbreviation for Plasma Display Panel. Also, the ELD is an abbreviation for Electro-Luminescence Display.

The storage unit 920 is a device for storing various data. The storage unit 920 is, for example, a magnetic storage device such as a hard disk drive (HDD), a semiconductor storage device, an optical storage device, or a magneto-optical storage device. The HDD is an abbreviation for Hard Disk Drive.

The drive 922 is a device that reads information recorded on the removal recording medium 928 such as a magnetic disk, an optical disk, a magneto-optical disk, or a semiconductor memory, or writes information in the removal recording medium 928. The removal recording medium 928 is, for example, a DVD medium, a Blu-ray medium, an HD-DVD medium, various types of semiconductor storage media, or the like. Of course, the removal recording medium 928 may be, for example, an electronic device or an IC card on which a non-contact IC chip is mounted. The IC is an abbreviation for Integrated Circuit.

The connection port 924 is a port such as an USB port, an IEEE1394 port, a SCSI, an RS-232C port, or a port for connecting an externally connected device 930 such as an optical audio terminal. The externally connected device 930 is, for example, a printer, a mobile music player, a digital camera, a digital video camera, or an IC recorder. Moreover, the USB is an abbreviation for Universal Serial Bus. Also, the SCSI is an abbreviation for Small Computer System Interface.

The communication unit 926 is a communication device to be connected to a network 932, and is, for example, a communication card for a wired or wireless LAN, Bluetooth (registered trademark), or WUSB, an optical communication router, an ADSL router, or a modem for various types of communication. The network 932 connected to the communication unit 926 is configured from a wire-connected or wirelessly connected network, and is the Internet, a home-use LAN, infrared communication, visible light communication, broadcasting, or satellite communication, for example. Moreover, the LAN is an abbreviation for Local Area Network.

Also, the WUSB is an abbreviation for Wireless USB. Furthermore, the ADSL is an abbreviation for Asymmetric Digital Subscriber Line.

7: CONCLUSION

Lastly, a technical idea of the present embodiment will briefly be summarized. The technical idea described below can be applied to various information processing apparatuses such as PCs, mobile phones, mobile game machines, mobile information terminals, information appliances, and car navigation systems.

The functional configuration of the above information processing apparatus can be expressed as follows. The information processing apparatus includes a first score calculation unit, a second score calculation unit, a scale conversion unit, and an evaluation score calculation unit described below. The first score calculation unit is a unit that calculates a first score indicating the degree of association between items. The second score calculation unit is a unit that calculates a second score indicating the degree of association between items. For example, the first score calculation unit calculates a first score by using a first recommendation algorithm. The second score calculation unit calculates a first score by using a second recommendation algorithm, which is different from the first recommendation algorithm.

The scale conversion unit converts a second score calculated by the second score calculation unit to the scale comparable to the scale of a first score calculated by the first score calculation unit based on relationship information indicating a relationship between the first score calculated by the first score calculation unit and the second score calculated by the second score calculation unit for the same item set to calculate a post-conversion score. As described above, the first score and the second score are calculated by using different recommendation algorithms. Thus, the first score and the second score have mutually different score systems. Therefore, the scale conversion unit converts the second score to fit to the score system of the first score.

If, for example, score systems are such that the first score is incomparably larger than the second score, the first score significantly affects recommendation results even if weighted to stress the second score. By converting the score system by the scale conversion unit, however, score systems of both scores have approximately the same scale and therefore, one score will not be stressed regardless of the intention of the user. After the second score is converted as described above, the evaluation score calculation unit calculates an evaluation score by combining a first score calculated by the first score calculation unit and a post-conversion score calculated by the scale conversion unit for the same item set. By using the evaluation score, high-precision recommendation results fitting to circumstances can be obtained.

(Notes)

The server apparatus 100 is an example of the information processing apparatus. The user terminal 200 is an example of the terminal apparatus. The recommendation system is an example of the information presentation system. The individual associated score calculation unit 101 is an example of the first score calculation unit, second score calculation unit, and third to N-th score calculation units (N≥3). The individual associated score correction unit 103 is an example of the scale conversion unit. The integrated associated score calculation unit 104 is an example of the evaluation score calculation unit/evaluation score presentation unit. The correction function generation unit 102 is an example of a related information generation unit. The weight adjustment unit 106 is an example of a count unit, adjustment implementation unit, count comparison unit, and individual weight management unit. The recommended item selection unit 105 is an example of a recommended item detection unit and recommendation unit. The integrated associated score acquisition unit 202 is an example of an evaluation score acquisition unit.

Some embodiments may comprise a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a computer-readable medium that can be considered to be a manufacture (i.e., article of manufacture) or a machine. Alternatively or additionally, the invention may be embodied as a computer readable medium other than a computer-readable storage medium, such as a propagating signal.

It should be understood by those skilled in the art that various modifications, combinations, sub-combinations and alterations may occur depending on design requirements and other factors insofar as they are within the scope of the appended claims or the equivalents thereof.

For example, the present technology can adopt the following configurations.

(1) An information processing apparatus comprising:
a first score calculation unit that calculates a first score indicating the degree of association between items;
a second score calculation unit that calculates a second score indicating the degree of association between items;
a scale conversion unit that converts the second score calculated by the second score calculation unit to a scale comparable to the scale of the first score based on relationship information indicating a relationship between the first score calculated by the first score calculation unit and the second score calculated by the second score calculation unit for a same item set to calculate a post-conversion score; and
an evaluation score calculation unit that calculates an evaluation score by combining the first score calculated by the first score calculation unit and the post-conversion score calculated by the scale conversion unit for the same item set.

(2) The information processing apparatus according to the (1), further comprising:
a relationship information generation unit that generates the relationship information by performing a regression analysis of the first score calculated by the first score calculation unit and the second score calculated by the second score calculation unit for the same item set.

(3) The information processing apparatus according to the (2),
wherein the relationship information generation unit periodically regenerates the relationship information.

(4) The information processing apparatus according to any one of the (1) to (3), wherein the evaluation score calculation unit weights the first score by using a first weight, weights the post-conversion score by using a second weight, and calculates the evaluation score by adding the weighted first score and the weighted post-conversion score.

(5) The information processing apparatus according to the (4), further comprising:

a feedback determination unit that, when an item related to a target item on which feedback is received from a user is recommended to the user based on the evaluation score and the user gives the feedback on the recommended item, determines whether the feedback given on the recommended item is the feedback indicating a positive trend; and a weight adjustment unit that, when the user gives the feedback on the recommended item, adjusts the first weight and the second weight in accordance with a determination result by the feedback determination unit, wherein the weight adjustment unit increases the first weight and decreases the second weight if determined to be the feedback indicating the positive trend by the feedback determination unit and the first score is larger than the post-conversion score, the weight adjustment unit decreases the first weight and increases the second weight if determined to be the feedback indicating the positive trend by the feedback determination unit and the first score is smaller than the post-conversion score, the weight adjustment unit decreases the first weight and increases the second weight if determined not to be the feedback indicating the positive trend by the feedback determination unit and the first score is larger than the post-conversion score, and the weight adjustment unit increases the first weight and decreases the second weight if determined not to be the feedback indicating the positive trend by the feedback determination unit and the first score is smaller than the post-conversion score.

(6) The information processing apparatus according to the (5), wherein the weight adjustment unit includes:

a count unit that counts a number of times CU of occurrence of an opportunity to increase the first weight and a number of times CD of occurrence of the opportunity to decrease the first weight;

a count comparison unit that compares the number of times CU and the number of times CD in predetermined timing; and an adjustment execution unit that, when a comparison result by the count comparison unit is obtained in the predetermined timing, adjusts the first weight and the second weight in accordance with the comparison result, the adjustment execution unit increases the first weight and decreases the second weight if the number of times CU exceeds the number of times CD, and the adjustment execution unit decreases the first weight and increases the second weight if the number of times CU falls short of the number of times CD.

(7) The information processing apparatus according to any one of the (4) to (6), further comprising:

a feedback determination unit that, when an item related to a target item on which feedback is received from a user is recommended to the user based on the evaluation score and the user gives the feedback on the recommended item, determines whether the feedback given on the recommended item is the feedback indicating a positive trend; and a weight adjustment unit that, when the user gives the feedback on the recommended item, adjusts the first weight and the second weight in accordance with a determination result by the feedback determination unit, wherein the evaluation score calculation unit weights the first score by using the first weight, weights the post-conversion score by using the second weight, and further weights the first score and the post-conversion score by using a third weight to calculate the evaluation score by adding the weighted first score and the weighted post-conversion score, and the weight adjustment unit does not change the first weight and the second weight if the third weight is 1, the weight adjustment unit increases the first weight and decreases the second weight if determined to be the feedback indicating the positive trend by the feedback determination unit and the third weight is larger than 1, the weight adjustment unit decreases the first weight and increases the second weight if determined to be the feedback indicating the positive trend by the feedback determination unit and the third weight is smaller than 1, the weight adjustment unit decreases the first weight and increases the second weight if determined not to be the feedback indicating the positive trend by the feedback determination unit and the third weight is larger than 1, and the weight adjustment unit increases the first weight and decreases the second weight if determined not to be the feedback indicating the positive trend by the feedback determination unit and the third weight is smaller than 1.

(8) The information processing apparatus according to the (7), wherein the weight adjustment unit includes:

a count unit that counts a number of times CU of occurrence of an opportunity to increase the first weight and a number of times CD of occurrence of the opportunity to decrease the first weight;

a count comparison unit that compares the number of times CU and the number of times CD in predetermined timing; and an adjustment execution unit that, when a comparison result by the count comparison unit is obtained in the predetermined timing, adjusts the first weight and the second weight in accordance with the comparison result, wherein the adjustment execution unit increases the first weight and decreases the second weight if the number of times CU exceeds the number of times CD, and the adjustment execution unit decreases the first weight and increases the second weight if the number of times CU falls short of the number of times CD.

(9) The information processing apparatus according to any one of the (5) to (8), further comprising:

an individual weight management unit that, when the first weight and the second weight are changed by the weight adjustment unit, manages the changed first weight and the changed second weight for each of the users.

(10) The information processing apparatus according to any one of the (1) to (9), further comprising:

an evaluation score presentation unit that presents the evaluation score calculated by the evaluation score calculation unit to a user.

(11) The information processing apparatus according to any one of the (1) to (10), further comprising:

third to N-th score calculation units that calculate third to N-th scores (N≥3) indicating the degree of association between items, wherein the scale conversion unit that, based on M-th relationship information indicating the relationship between the first score calculated by the first score calculation unit and the M-th score calculated by the M-th score calculation unit (2≤M≤N) for the same item set, converts the M-th score calculated by the M-th score calculation unit to the scale comparable to the scale of the first score to calculate an M-th post-conversion score, and the evaluation score calculation unit calculates the evaluation score by combining the first score calculated by the first score calculation unit and the second to N-th post-conversion scores calculated by the scale conversion unit.

(12) The information processing apparatus according to any one of the (1) to (11), further comprising:

a recommended item detection unit that detects the item whose evaluation score with the target item on which feedback is received from a user calculated by the evaluation score calculation unit becomes a large value; and a recommendation unit that recommends the item detected by the recommended item detection unit to the user.

(13) The information processing apparatus according to any one of the (1) to (12), wherein the relationship information generation unit derives a function indicating a regression line or a regression curve by a linear regression analysis or a non-linear regression analysis for a coordinate point distribution of coordinate points (Xk, Yk) composed of a first score Xk calculated by the first score calculation unit and a second score Yk calculated by the second score calculation unit for a k-th (k=1 to K) item set and sets the function indicating the regression line or the regression curve as the relationship information.

(14) The information processing apparatus according to claim any one of the (1) to (13), wherein the first score calculation unit calculates the first score by cooperative filtering or content-based filtering, and the second score calculation unit calculates the second score by a method other than the method used by the first score calculation unit of the cooperative filtering and the content-based filtering.

(15) The information processing apparatus according to any one of the (4) to (14), further comprising:

a weight adjustment unit that decreases the first weight and increases the second weight if the item for which the second score is less likely to increase should strongly be recommended.

(16) The information processing apparatus according to any one of the (4) to (15), wherein if there is the item for which the second score is not calculated until a predetermined condition is satisfied, the evaluation score calculation unit calculates the evaluation score by using the first score calculated by the first score calculation unit for an item set containing the item in a period until the predetermined condition is satisfied.

(17) A terminal apparatus comprising:

a feedback input unit to give feedback on an item;

a feedback notification unit that notifies a server apparatus of information about the item whose feedback is given by the feedback input unit;

an evaluation score acquisition unit that acquires an evaluation score indicating the degree of association between the item whose information is notified by the feedback notification unit and the other item from the server apparatus; and an information presentation unit that presents the evaluation score acquired by the evaluation score acquisition unit or the information about the item whose evaluation score is high to a user, wherein the server apparatus includes:

a first score calculation unit that calculates a first score indicating the degree of association between items;

a second score calculation unit that calculates a second score indicating the degree of association between items;

a scale conversion unit that converts the second score calculated by the second score calculation unit to a scale comparable to the scale of the first score based on relationship information indicating a relationship between the first score calculated by the first score calculation unit and the second score calculated by the second score calculation unit for a same item set to calculate a post-conversion score; and an evaluation score calculation unit that calculates the evaluation score by combining the first score calculated by the first score calculation unit and the post-conversion score calculated by the scale conversion unit for the same item set.

(18) An information presentation system comprising:

a terminal apparatus including:
a feedback input unit to give feedback on an item;
a feedback notification unit that notifies a server apparatus of information about the item whose feedback is given by the feedback input unit;
an evaluation score acquisition unit that acquires an evaluation score indicating the degree of association between the item whose information is notified by the feedback notification unit and the other item from the server apparatus; and
an information presentation unit that presents the evaluation score acquired by the evaluation score acquisition unit or the information about the item whose evaluation score is high to a user; and the server apparatus including:
a first score calculation unit that calculates a first score indicating the degree of association between items;
a second score calculation unit that calculates a second score indicating the degree of association between items;
a scale conversion unit that converts the second score calculated by the second score calculation unit to a scale comparable to the scale of the first score based on relationship information indicating a relationship between the first score calculated by the first score calculation unit and the second score calculated by the second score calculation unit for a same item set to calculate a post-conversion score; and
an evaluation score calculation unit that calculates the evaluation score by combining the first score calculated by the first score calculation unit and the post-conversion score calculated by the scale conversion unit for the same item set.

(19) A calculation method of an evaluation score, comprising:

calculating a first score indicating the degree of association between items;

calculating a second score indicating the degree of association between items;

converting the second score to a scale comparable to the scale of the first score based on relationship information indicating a relationship between the first score and the second score for a same item set to calculate a post-conversion score; and calculating the evaluation score by combining the first score and the post-conversion score for the same item set.

(20) A program causing a computer to realize:

a first score calculation function of calculating a first score indicating the degree of association between items;

a second score calculation function of calculating a second score indicating the degree of association between items;

a scale conversion function of converting the second score calculated by the second score calculation function to a scale comparable to the scale of the first score based on relationship information indicating a relationship between the first score calculated by the first score calculation function and the second score calculated by the second score calculation function for a same item set to calculate a post-conversion score; and an evaluation score calculation function of calculating an evaluation score by combining the first score calculated by the first score calculation function and the post-conversion score calculated by the scale conversion function for the same item set.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein is meant to encompass the items listed thereafter and equivalents thereof as well as additional items.

The present disclosure contains subject matter related to that disclosed in Japanese Priority Patent Application JP 2011-050478 filed in the Japan Patent Office on Mar. 8, 2011, the entire content of which is hereby incorporated by reference.

What is claimed is:

1. Apparatus for selecting an item to recommend to a user from a plurality of items, the apparatus comprising:
   at least one processor; and
   at least one memory storing processor-executable instructions configured to cause the at least one processor to:
      calculate a first set of scores indicating degrees of association between items of the plurality of items using a first scoring algorithm having a first scale;
      calculate a second set of scores indicating degrees of association between items of the plurality of items using a second scoring algorithm having a second scale, each score in the second set of scores indicating a degree of association between certain items of the plurality of items and having a corresponding score in the first set of scores indicating a degree of association between the certain items;
      compare at least one score in the first set of scores and a corresponding at least one score in the second set of scores to identify a relationship between the at least one score in the first set of scores and the corresponding at least one score in the second set of scores;
      generate a correction function based at least in part on the identified relationship;
      apply the correction function to each of the scores in the second set of scores to adjust the second set of scores to conform to the first scale;
      calculate a third set of scores for the plurality of items by combining the first set of scores and the adjusted second set of scores, the combining comprising:
         establishing a first weight to be applied to the first set of scores and a second weight to be applied to the adjusted second set of scores;
         comparing one or more scores in the first set of scores and a corresponding one or more scores in the adjusted second set of scores;
         if the one or more scores in the first set of scores is greater than the corresponding one or more scores in the adjusted second set of scores, adjusting the first weight and the second weight by decreasing the first weight, increasing the second weight, or decreasing the first weight and increasing the second weight;
         if the one or more scores in the first set of scores is not greater than the corresponding one or more scores in the adjusted second set of scores, adjusting the first weight and the second weight by increasing the first weight, decreasing the second weight, or increasing the first weight and decreasing the second weight;
         applying the adjusted first weight to the first set of scores and the adjusted second weight to the adjusted second set of scores; and
      select an item to recommend to the user from the plurality of items based on the third set of scores.

2. The apparatus of claim 1, wherein the first scoring algorithm comprises a cooperative filtering algorithm.

3. The apparatus of claim 1, wherein the first scoring algorithm comprises a content-based filtering algorithm.

4. The apparatus of claim 1, wherein applying the correction function comprises performing a regression analysis between the first set of scores and the second set of scores, the regression analysis comprising application of an Expectation Maximization (EM) algorithm and/or a Wake-Sleep algorithm to the first set of scores and the second set of scores.

5. The apparatus of claim 1, wherein the second weight is different than the first weight.

6. The apparatus of claim 5, wherein the processor-executable instructions are further configured to cause the at least one processor to adjust the first weight and/or the second weight based on positive or negative feedback from the user regarding the selected item.

7. The apparatus of claim 1, wherein the correction function is a non-linear correction function, and wherein the at least one memory stores processor-executable instructions configured to cause the at least one processor to generate the correction function by performing a non-linear regression analysis comprising polynomial regression analysis, power regression analysis, logarithmic regression analysis and/or exponential regression analysis.

8. A method for selecting an item to recommend to a user from a plurality of items, the method comprising:
   calculating a first set of scores indicating degrees of association between items of the plurality of items using a first scoring algorithm having a first scale;
   calculating a second set of scores indicating degrees of association between items of the plurality of items using a second scoring algorithm having a second scale, each score in the second set of scores indicating a degree of association between certain items of the plurality of items and having a corresponding score in the first set of scores indicating a degree of association between the certain items;
   comparing at least one score in the first set of scores and a corresponding at least one score in the second set of scores to identify a relationship between the at least one score in the first set of scores and the corresponding at least one score in the second set of scores;
   generating a correction function based at least in part on the identified relationship;
   applying, using at least one processor, the correction function to each of the scores in the second set of scores to adjust the second set of scores to conform to the first scale;

calculating a third set of scores for the plurality of items by combining the first set of scores and the adjusted second set of scores, the combining comprising:
  establishing a first weight to be applied to the first set of scores and a second weight to be applied to the adjusted second set of scores;
  comparing one or more scores in the first set of scores and a corresponding one or more scores in the adjusted second set of scores;
  if the one or more scores in the first set of scores is greater than the corresponding one or more scores in the adjusted second set of scores, adjusting the first weight and the second weight by decreasing the first weight, increasing the second weight, or decreasing the first weight and increasing the second weight;
  if the one or more scores in the first set of scores is not greater than the corresponding one or more scores in the adjusted second set of scores, adjusting the first weight and the second weight by increasing the first weight, decreasing the second weight, or increasing the first weight and decreasing the second weight;
  applying the adjusted first weight to the first set of scores and the adjusted second weight to the adjusted second set of scores; and
selecting an item to recommend to the user from the plurality of items based on the third set of scores.

9. The method of claim 8, wherein applying the correction function comprises performing a regression analysis between the first set of scores and the second set of scores, the regression analysis comprising application of an Expectation Maximization (EM) algorithm and/or a Wake-Sleep algorithm to the first set of scores and the second set of scores.

10. The method of claim 8, wherein the second weight is different than the first weight.

11. The method of claim 10, further comprising adjusting the first weight and/or the second weight based on feedback from the user regarding the selected item.

12. At least one computer-readable storage medium encoded with computer-executable instructions that, when executed, perform a method for selecting an item to recommend to a user from a plurality of items, the method comprising:
  calculating a first set of scores indicating degrees of association between items of the plurality of items using a first scoring algorithm having a first scale;
  calculating a second set of scores indicating degrees of association between items of the plurality of items using a second scoring algorithm having a second scale, each score in the second set of scores indicating a degree of association between certain items of the plurality of items and having a corresponding score in the first set of scores indicating a degree of association between the certain items;
  comparing at least one score in the first set of scores and a corresponding at least one score in the second set of scores to identify a relationship between the at least one score in the first set of scores and the corresponding at least one score in the second set of scores;
  generating a correction function based at least in part on the identified relationship;
  applying the correction function to each of the scores in the second set of scores to adjust the second set of scores to conform to the first scale;
  calculating a third set of scores for the plurality of items by combining the first set of scores and the adjusted second set of scores, the combining comprising:
    establishing a first weight to be applied to the first set of scores and a second weight to be applied to the adjusted second set of scores;
    comparing one or more scores in the first set of scores and a corresponding one or more scores in the adjusted second set of scores;
    if the one or more scores in the first set of scores is greater than the corresponding one or more scores in the adjusted second set of scores, adjusting the first weight and the second weight by decreasing the first weight, increasing the second weight, or decreasing the first weight and increasing the second weight;
    if the one or more scores in the first set of scores is not greater than the corresponding one or more scores in the adjusted second set of scores, adjusting the first weight and the second weight by increasing the first weight, decreasing the second weight, or increasing the first weight and decreasing the second weight;
    applying the adjusted first weight to the first set of scores and the adjusted second weight to the adjusted second set of scores; and
  selecting an item to recommend to the user from the plurality of items based on the third set of scores.

13. The at least one computer-readable storage medium of claim 12, wherein applying the correction function comprises performing a regression analysis between the first set of scores and the second set of scores, the regression analysis comprising application of an Expectation Maximization (EM) algorithm and/or a Wake-Sleep algorithm to the first set of scores and the second set of scores.

14. The at least one computer-readable storage medium of claim 12, wherein the method further comprises adjusting the first weight and/or the second weight based on feedback from the user regarding the selected item.

15. Apparatus for selecting an item to recommend to a user from a plurality of items, the apparatus comprising:
  means for calculating a first set of scores indicating degrees of association between items of the plurality of items using a first scoring algorithm having a first scale;
  means for calculating a second set of scores indicating degrees of association between items of the plurality of items using a second scoring algorithm having a second scale, each score in the second set of scores indicating a degree of association between certain items of the plurality of items and having a corresponding score in the first set of scores indicating a degree of association between the certain items;
  means for comparing at least one score in the first set of scores and a corresponding at least one score in the second set of scores to identify a relationship between the at least one score in the first set of scores and the corresponding at least one score in the second set of scores;
  means for generating a correction function based at least in part on the identified relationship;
  means for applying the correction function to each of the scores in the second set of scores to adjust the second set of scores to conform to the first scale;
  means for calculating a third set of scores for the plurality of items by combining the first set of scores and the adjusted second set of scores, the combining comprising:
    establishing a first weight to be applied to the first set of scores and a second weight to be applied to the adjusted second set of scores;

comparing one or more scores in the first set of scores and a corresponding one or more scores in the adjusted second set of scores;

if the one or more scores in the first set of scores is greater than the corresponding one or more scores in the adjusted second set of scores, adjusting the first weight and the second weight by decreasing the first weight, increasing the second weight, or decreasing the first weight and increasing the second weight;

if the one or more scores in the first set of scores is not greater than the corresponding one or more scores in the adjusted second set of scores, adjusting the first weight and the second weight by increasing the first weight, decreasing the second weight, or increasing the first weight and decreasing the second weight;

applying the adjusted first weight to the first set of scores and the adjusted second weight to the adjusted second set of scores; and means for selecting an item to recommend to the user from the plurality of items based on the third set of scores.

16. The apparatus of claim 15, wherein applying the correction function comprises performing a regression analysis between the first set of scores and the second set of scores, the regression analysis comprising application of an Expectation Maximization (EM) algorithm and/or a Wake-Sleep algorithm to the first set of scores and the second set of scores.

17. The apparatus of claim 15, wherein the second weight is different than the first weight.

18. The apparatus of claim 17, further comprising means for adjusting the first weight and/or the second weight based on feedback from the user regarding the selected item.

* * * * *